(12) United States Patent
Amin et al.

(10) Patent No.: US 9,487,434 B2
(45) Date of Patent: Nov. 8, 2016

(54) STRENGTHENED GLASS WITH DEEP DEPTH OF COMPRESSION

(71) Applicant: CORNING INCORPORATED, Corning, NY (US)

(72) Inventors: Jaymin Amin, Corning, NY (US); Benedict Osobomen Egboiyi, Painted Post, NY (US); Jonathan David Pesansky, Corning, NY (US); Kevin Barry Reiman, Horseheads, NY (US); Rostislav Vatchev Roussev, Painted Post, NY (US); Brian Paul Strines, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/158,167

(22) Filed: May 18, 2016

(65) Prior Publication Data

US 2016/0257605 A1 Sep. 8, 2016

Related U.S. Application Data

(63) Continuation of application No. 14/530,073, filed on Oct. 31, 2014, and a continuation-in-part of application No. 14/530,155, filed on Oct. 31, 2014.

(Continued)

(51) Int. Cl.
 *C03C 21/00* (2006.01)
 *C03C 3/091* (2006.01)
 (Continued)

(52) U.S. Cl.
 CPC ............... *C03C 3/097* (2013.01); *C03C 3/04* (2013.01); *C03C 3/087* (2013.01); *C03C 3/091* (2013.01);
 (Continued)

(58) Field of Classification Search
 CPC ......... C03C 4/18; C03C 21/002; C03C 3/04; C03C 2204/00
 See application file for complete search history.

(56) References Cited

U.S. PATENT DOCUMENTS

| 3,433,611 A | 3/1969 | Saunders et al. |
| 3,798,013 A | 3/1974 | Inoue et al. |

(Continued)

FOREIGN PATENT DOCUMENTS

| CN | 102690059 | 9/2012 |
| EP | 700879 | 3/1996 |

(Continued)

OTHER PUBLICATIONS

PCTUS2015041976 Search Report dated Oct. 29, 2015.
(Continued)

*Primary Examiner* — Laura Auer
(74) *Attorney, Agent, or Firm* — John T. Haran

(57) ABSTRACT

Chemically strengthened glass articles having at least one deep compressive layer extending from a surface of the article to a depth of at least about 45 μm within the article are provided. In one embodiment, the compressive stress profile includes a single linear segment extending from the surface to the depth of compression DOC. Alternatively, the compressive stress profile includes two linear portions: the first portion extending from the surface to a relatively shallow depth and having a steep slope; and a second portion extending from the shallow depth to the depth of compression. The strengthened glass has a 60% survival rate when dropped from a height of 80 cm in an inverted ball drop test and an equibiaxial flexural strength of at least 10 kgf as determined by abraded ring-on-ring testing. Methods of achieving such stress profiles are also described.

37 Claims, 35 Drawing Sheets

Related U.S. Application Data

(60) Provisional application No. 61/943,758, filed on Feb. 24, 2014, provisional application No. 62/014,464, filed on Jun. 19, 2014, provisional application No. 62/014,372, filed on Jun. 19, 2014, provisional application No. 62/029,075, filed on Jul. 25, 2014.

(51) Int. Cl.
| | |
|---|---|
| *C03C 4/18* | (2006.01) |
| *C03C 3/097* | (2006.01) |
| *C03C 3/093* | (2006.01) |
| *C03C 3/095* | (2006.01) |
| *C03C 3/087* | (2006.01) |
| *C03C 3/04* | (2006.01) |

(52) U.S. Cl.
CPC .............. *C03C 3/093* (2013.01); *C03C 3/095* (2013.01); *C03C 4/18* (2013.01); *C03C 21/00* (2013.01); *C03C 21/002* (2013.01); *C03C 2204/00* (2013.01); *Y10T 428/315* (2015.01)

(56) References Cited

U.S. PATENT DOCUMENTS

| | | | |
|---|---|---|---|
| 4,042,405 A | 8/1977 | Krohn et al. | |
| 4,726,981 A | 2/1988 | Pierson et al. | |
| 5,350,607 A | 9/1994 | Tyson et al. | |
| 5,773,148 A | 6/1998 | Charrue et al. | |
| 5,895,768 A | 4/1999 | Speit | |
| 6,111,821 A | 8/2000 | Bach | |
| 8,158,543 B2 | 4/2012 | Dejneka et al. | |
| 8,312,789 B2 | 11/2012 | Beck | |
| 8,349,455 B2 | 1/2013 | Kondo et al. | |
| 8,415,013 B2 | 4/2013 | Barefoot et al. | |
| 8,431,502 B2 | 4/2013 | Dejneka et al. | |
| 8,561,429 B2 | 10/2013 | Allan et al. | |
| 8,586,492 B2 | 11/2013 | Barefoot et al. | |
| 8,623,776 B2 | 1/2014 | Dejneka et al. | |
| 8,652,978 B2 | 2/2014 | Dejneka et al. | |
| 8,756,262 B2 | 6/2014 | Zhang | |
| 8,783,063 B2 | 7/2014 | Osakabe et al. | |
| 8,802,581 B2 | 8/2014 | Dejneka et al. | |
| 8,946,103 B2 | 2/2015 | Dejneka et al. | |
| 8,951,927 B2 | 2/2015 | Dejneka et al. | |
| 8,957,374 B2 | 2/2015 | Liu et al. | |
| 8,969,226 B2 | 3/2015 | Dejneka et al. | |
| 9,140,543 B1 | 9/2015 | Allan et al. | |
| 9,156,724 B2 | 10/2015 | Gross | |
| 9,290,407 B2 | 3/2016 | Barefoot et al. | |
| 9,290,413 B2 | 3/2016 | Dejneka et al. | |
| 2005/0250639 A1 | 11/2005 | Siebers et al. | |
| 2007/0060465 A1 | 3/2007 | Varshneya et al. | |
| 2009/0197088 A1 | 8/2009 | Murata | |
| 2010/0003508 A1 | 1/2010 | Arrouy et al. | |
| 2010/0028607 A1 | 2/2010 | Lee et al. | |
| 2010/0087307 A1 | 4/2010 | Murata et al. | |
| 2010/0119846 A1 | 5/2010 | Sawada | |
| 2011/0014475 A1 | 1/2011 | Murata | |
| 2011/0294649 A1 | 12/2011 | Gomez et al. | |
| 2012/0052271 A1 | 3/2012 | Gomez et al. | |
| 2012/0052275 A1 | 3/2012 | Hashimoto et al. | |
| 2012/0135153 A1 | 5/2012 | Osakabe et al. | |
| 2012/0135226 A1 | 5/2012 | Bookbinder et al. | |
| 2012/0171497 A1 | 7/2012 | Koyama et al. | |
| 2012/0196110 A1 | 8/2012 | Murata et al. | |
| 2012/0219792 A1 | 8/2012 | Yamamoto et al. | |
| 2012/0321898 A1 | 12/2012 | Meinhardt et al. | |
| 2013/0017380 A1 | 1/2013 | Murata et al. | |
| 2013/0045375 A1 | 2/2013 | Gross | |
| 2013/0101798 A1 | 4/2013 | Hashimoto | |
| 2013/0122260 A1 | 5/2013 | Liang | |
| 2013/0122284 A1 | 5/2013 | Gross | |
| 2013/0183512 A1 | 7/2013 | Gy et al. | |
| 2013/0202868 A1 | 8/2013 | Barefoot et al. | |
| 2013/0224492 A1 | 8/2013 | Bookbinder et al. | |
| 2013/0236666 A1 | 9/2013 | Bookbinder et al. | |
| 2013/0236699 A1 | 9/2013 | Prest et al. | |
| 2013/0240025 A1 | 9/2013 | Bersano et al. | |
| 2013/0309613 A1 | 11/2013 | O'Malley et al. | |
| 2014/0050911 A1 | 2/2014 | Mauro et al. | |
| 2014/0087159 A1 | 3/2014 | Cleary et al. | |
| 2014/0106172 A1 | 4/2014 | Dejneka et al. | |
| 2014/0113141 A1 | 4/2014 | Yamamoto et al. | |
| 2014/0139978 A1 | 5/2014 | Kwong | |
| 2014/0150525 A1 | 6/2014 | Okawa et al. | |
| 2014/0193606 A1 | 7/2014 | Kwong | |
| 2014/0370264 A1 | 12/2014 | Ohara et al. | |
| 2015/0030834 A1 | 1/2015 | Morey et al. | |
| 2015/0030838 A1 | 1/2015 | Sellier et al. | |
| 2015/0132563 A1 | 5/2015 | O'Malley et al. | |
| 2015/0147575 A1 | 5/2015 | Dejneka et al. | |
| 2015/0183680 A1 | 7/2015 | Barefoot et al. | |
| 2015/0239775 A1 | 8/2015 | Amin et al. | |
| 2015/0239776 A1 | 8/2015 | Amin et al. | |
| 2015/0259244 A1 | 9/2015 | Amin et al. | |
| 2015/0368148 A1 | 12/2015 | Duffy et al. | |
| 2015/0368153 A1 | 12/2015 | Pesansky et al. | |

FOREIGN PATENT DOCUMENTS

| | | |
|---|---|---|
| EP | 2415724 | 2/2012 |
| GB | 1334828 | 1/1972 |
| JP | 2009099239 | 5/2009 |
| JP | 2010202514 | 9/2010 |
| WO | 2005091021 | 9/2005 |
| WO | 2010005578 | 1/2010 |
| WO | 2011077756 | 6/2011 |
| WO | 2012074983 | 6/2012 |
| WO | 2012126394 | 9/2012 |
| WO | 20120126394 | 9/2012 |
| WO | 2013088856 | 6/2013 |
| WO | 2013136013 | 9/2013 |
| WO | 213184205 | 12/2013 |
| WO | 2015127483 | 8/2015 |

OTHER PUBLICATIONS

Aegerter et al; "Sol-gel technologies for glass producers and users—Chapter 4.1.8—Scratch resistant coatings (G. Helsch and G. H. Frischat)", pp. 217-221, Kluwer Academic Publishers, 2004.
ASTM C1279-13 "Standard Test Method for Non-Destructive Photoelastic Measurement of Edge and Surface Stresses in Annealed, Heat-Strengthened, and Fully Tempered Flat Glass".
ASTM C1422/C1422M-10 "Standard Specification for Chemically Strengthened Flat Glass".
Bahlawane "Novel sol-gel process depositing a-Al2O3 for the improvement of graphite oxidation-resistance" Thin Solid Films, vol. 396, pp. 126-130, 2001.
Dessler et al; "Differences between films and monoliths of sol-gel derived aluminas", Thin Solid Films, vol. 519, pp. 42-51, 2010.
Fu et al, "Preparation of alumina films from a new sal-gel route" Thin Solid films 348, pp. 99-102 (1999).
Hauk "Sol-gel preparation of scratch-resistant Al2O3 coatings on float glass", Glass Science and Technology: Glastechnische Berichte, 72(12), pp. 386, 1999.
International Search Report and the Written Opinoin of the International Searching Authority; PCT/SU2015/035448; Dated Sep. 18, 2015; 11 Pages.
International Search Report and the Written Opinoin of the International Searching Authority; PCT/US2015/023507 Search Report; 19 Pages.
International Search Report and the Written Opinpoin of the International Searching Authority; PCT/US2015/034996 Search Report Dated Jan. 4, 2016; 13 Pages.
International Search Report and the Written Opinoin of the International Searching Authority; PCT/US2015/058919 Search Report Dated Jan. 11, 2016; 11 Pages.
International Search Report and the Written Opinoin of the International Searching International Searching Authority; PCT/US2015/058322; Dated Jan. 8, 2016; 14 Pages.

(56) References Cited

OTHER PUBLICATIONS

Pflitsch et al; "Sol-gel deposition of chromium doped aluminum oxide films (Ruby) for surface temperature sensor application", Chem. Mater., vol. 20, pp. 2773-2778, 2008.

Stosser et al; "Magnetic Resonance investigation of the process of corundum formation starting from sol-gel precursors", J. Am. Ceram. Soc, vol. 88, No. 10, pp. 2913-2922, 2005.

Amin et al; U.S. Appl. No. 14/926,425, filed Oct. 29, 2015, titled "Strengthened Glass With Ultra-Deep Depth of Compression".

Oram et al.; U.S. Appl. No. 14/932,411, filed Nov. 4, 2015, Titled "Deep Non-Frangible Stress Profiles and Methods of Making".

STRENGTHENED GLASS WITH DEEP DEPTH OF COMPRESSION

This application is a continuation of and claims the benefit of priority to U.S. patent application Ser. No. 14/530,073, filed Oct. 31, 2014 and U.S. patent application Ser. No. 14/530,155, filed Oct. 31, 2014, each of which claims the benefit of priority under 35 U.S.C. §119 of U.S. Provisional Patent Application Ser. No. 61/943,758, filed on Feb. 24, 2014; U.S. Provisional Patent Application Ser. No. 62/014,464, filed on Jun. 19, 2014; U.S. Provisional Patent Application Ser. No. 62/014,372, filed on Jun. 19, 2014; and U.S. Provisional Patent Application Ser. No. 62/029,075, filed on Jul. 25, 2014, the contents of each of the above applications is relied upon and incorporated herein by reference in its entirety.

BACKGROUND

The disclosure relates to a chemically strengthened glass article. More particularly, the disclosure relates to chemically strengthened glasses having a deep compressive surface layer.

Strengthened glasses are widely used in electronic devices as cover plates or windows for portable or mobile electronic communication and entertainment devices, such as cellular phones, smart phones, tablets, video players, information terminal (IT) devices, laptop computers and the like, as well as in other applications. As strengthened glasses are increasingly being utilized, it has become more important to develop strengthened glass materials having improved survivability, especially when subjected to tensile stresses and/or relatively deep flaws caused by contact with hard/sharp surfaces.

SUMMARY

Chemically strengthened glass articles having at least one deep compressive layer extending from a surface of the article to a depth of at least about 45 µm within the article are provided. In one embodiment, the compressive stress profile includes a single linear segment or portion extending from the surface to the depth of compression DOC. Alternatively, the compressive stress profile includes two approximately linear portions: the first portion extending from the surface to a relatively shallow depth and having a relatively steep slope; and a second portion extending from the shallow depth to the depth of compression. The strengthened glass has a 60% survival rate when dropped from a height of 100 cm in an inverted ball drop test and an equibiaxial flexural strength of at least 10 kgf as determined by abraded ring-on-ring testing. Methods of achieving such stress profiles are also described.

Accordingly, one aspect of the disclosure is to provide a glass article. The glass article has a thickness t and a compressive layer having a surface compressive stress CS in a range from about 700 MPa up to about 1000 MPa at a surface. The compressive layer extends from the surface to a depth of compression DOC, wherein DOC≥0.1·t when t<0.5 mm and DOC≥50 µm when t≥0.5 mm. The compressive layer has a compressive stress profile comprising a first portion b extending from the surface to a depth $d_b$ and having a slope $m_b$, wherein 3 µm≤$d_b$≤15 µm and −40 MPa/µm≥$m_b$≥−200 MPa/µm; and a second portion c extending from $d_c$ to the depth of compression DOC and having a slope $m_c$, wherein −2 MPa/µm≥$m_c$≥−8 MPa/µm.

In a second aspect, a glass article is provided. The glass article has a thickness t and a compressive region having a compressive stress CS in a range from about 150 MPa to about 400 MPa at a surface. The compressive region extends from the surface to a depth of compression DOC and has a compressive stress profile, wherein DOC≥0.1·t when t<0.5 mm and DOC≥50 µm when t≥0.5 mm. The compressive stress profile has a linear portion a extending from the surface to a depth $d_a$ and a slope $m_a$, wherein the depth $d_a$ is equal to the depth of compression and −2 MPa/µm≥$m_a$≥−8 MPa/µm.

A third aspect of the disclosure is to provide a strengthened glass. The strengthened glass has a thickness t, an inner region under a central tension CT, and at least one compressive layer under a compressive stress CS at a surface. The compressive layer extends from the surface of the glass to a depth of compression DOC, wherein DOC≥0.1·t when t<0.5 mm and DOC≥50 µm when t≥0.5 mm, and is adjacent to the inner region. The strengthened glass has at least a 60% survival rate when dropped in an inverted ball drop test from a height of about 80 cm onto an abrasive material disposed on the surface of the glass.

A fourth aspect of the disclosure is to provide a strengthened glass. The strengthened glass the strengthened glass has a thickness t, an inner region under a central tension CT, and at least one compressive stress layer under a compressive stress CS at a surface of the glass. The compressive stress layer extends from a surface of the glass to a depth of compression DOC, wherein DOC≥0.1·t when t<0.5 mm and DOC≥50 µm when t≥0.5 mm, and is adjacent to the inner region. The strengthened glass has an equibiaxial flexural strength of at least 10 kgf up to about 50 kgf as determined by abraded ring-on-ring testing.

These and other aspects, advantages, and salient features will become apparent from the following detailed description, the accompanying drawings, and the appended claims.

BRIEF DESCRIPTION OF THE DRAWINGS

FIG. 4b is a plot of the compressive stress profile determined from the index profiles shown in FIG. 4a;

FIG. 5b is a plot of the compressive stress profile determined from the index profiles shown in FIG. 5a;

FIG. 6b is a plot of the compressive stress profile determined from the index profiles shown in FIG. 6a;

FIG. 7b is a plot of the compressive stress profile determined from the index profiles shown in FIG. 7a;

FIG. 8b is a plot of the compressive stress profile determined from the index profiles shown in FIG. 8a;

DETAILED DESCRIPTION

Figure 1:
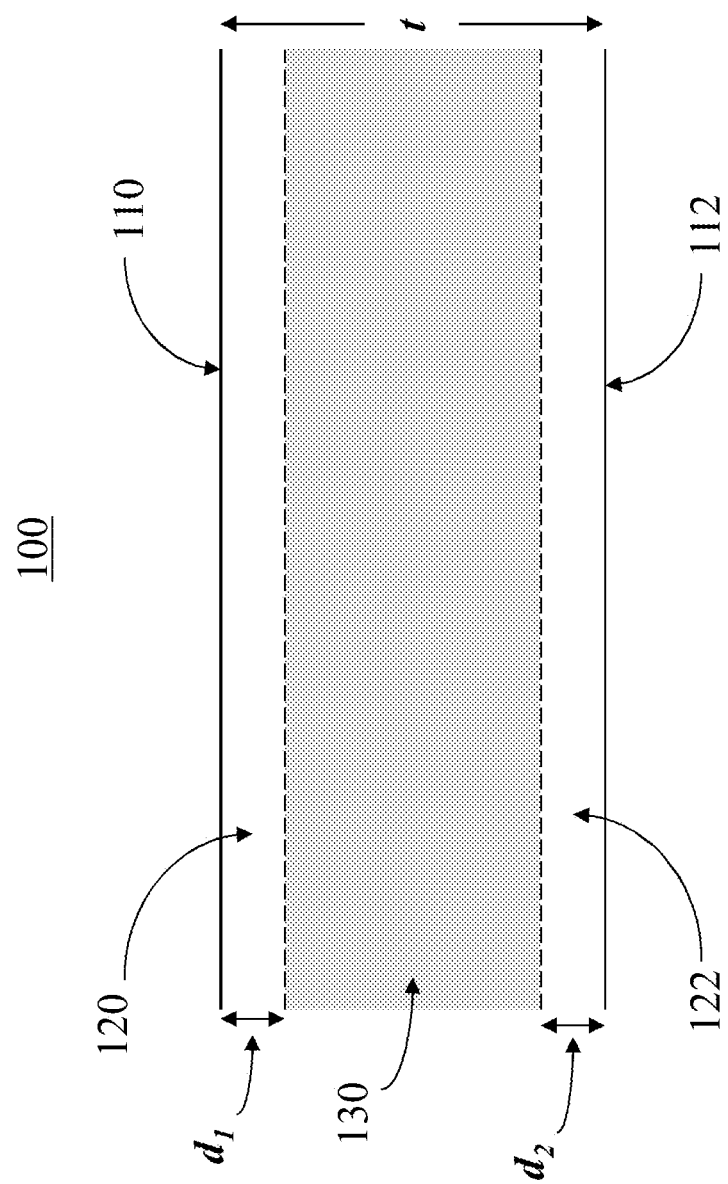
FIG. 1 is a schematic cross-sectional view of a chemically strengthened glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all glass compositions are expressed in terms of mole percent (mol %) and all ion exchange bath compositions are expressed in terms of weight percent (wt %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant; i.e., less than 0.1 mol %.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "depth of layer" and "DOL" refer to the depth of the compressive layer as determined by surface stress meter (FSM) measurements using commercially available instruments such as the FSM-6000.

As used herein, the terms "depth of compression" and "DOC" refer to the depth at which the stress within the glass changes from compressive to tensile stress. At the DOC, the stress crosses from a positive (compressive) stress to a negative (tensile) stress and thus has a value of zero.

As described herein, compressive stress (CS) and central tension (CT) are expressed in terms of megaPascals (MPa), depth of layer (DOL) and depth of compression (DOC) are expressed in terms of microns (μm), where 1 μm=0.001 mm, and thickness t is expressed herein in terms of millimeters, where 1 mm=1000 μm, unless otherwise specified.

As used herein, the term "fracture," unless otherwise specified, means that a crack propagates across the entire thickness and/or entire surface of a substrate when that substrate is dropped or impacted with an object.

According to the scientific convention normally used in the art, compression is expressed as a negative (<0) stress and tension is expressed as a positive (>0) stress. Throughout this description, however, compressive stress CS is expressed as a positive or absolute value—i.e., as recited herein, CS=|CS| and central tension or tensile stress is expressed as a negative value in order to better visualize the compressive stress profiles described herein.

As used herein, the "slope (m)" refers to the slope of a segment or portion of the stress profile that closely approximates a straight line. The predominant slope is defined as the average slope for regions that are well approximated as straight segments. These are regions in which the absolute value of the second derivative of the stress profile is smaller than the ratio of the absolute value of the first derivative, and approximately half the depth of the region. For a steep, shallow segment of the stress profile near the surface of the strengthened glass article, for example, the essentially straight segment is the portion for each point of which the absolute value of the second derivative of the stress profile is smaller than the absolute value of the local slope of the stress profile divided by the depth at which the absolute value of the stress changes by a factor of 2. Similarly, for a segment of the profile deeper within the glass, the straight portion of the segment is the region for which the local second derivative of the stress profile has an absolute value that is smaller than the absolute value of the local slope of the stress profile divided by half the DOC.

For typical stress profiles, this limit on the second derivative guarantees that the slope changes relatively slowly with depth, and is therefore reasonably well defined and can be used to define regions of slope that are important for the stress profiles that are considered advantageous for drop performance.

Let the stress as profile a function of depth x be given by the function $$\sigma = \sigma(x) \tag{1}$$

and let the first derivative of the stress profile with respect to depth be $$\sigma' = \frac{d\sigma}{dx}, \tag{2}$$

and the second derivative be $$\sigma'' = \frac{d^2\sigma}{dx^2}. \tag{3}$$

If a shallow segment extends approximately to a depth $d_s$, then for the purposes of defining a predominant slope, a straight portion of the profile is a region where $$|\sigma''(x)| < \left|2\frac{\sigma'(x)}{d_s}\right|. \tag{4}$$

If a deep segment extends approximately to a larger depth DOC, or to a larger depth $d_d$, or to a depth DOL in traditional terms, then a straight portion of the profile is a region where $$|\sigma''(x)| < \left|2\frac{\sigma'(x)}{d_d}\right| \approx \left|2\frac{\sigma'(x)}{DOC}\right| \approx \left|2\frac{\sigma'(x)}{DOL}\right|. \tag{5}$$

The latter equation is also valid for a 1-segment stress profile obtained by a single ion exchange in a salt containing only a single alkali ion other than the ion being replaced in the glass for chemical strengthening.

Preferably, the straight segments are selected as regions where $$|\sigma''(x)| < \left|\frac{\sigma'(x)}{d}\right|, \tag{6}$$

where d stands for the relevant depth for the region, shallow or deep.

The slope m of linear segments of the compressive stress profiles described herein are given as absolute values of the slope $$\frac{d\sigma}{dx}$$

—i.e., m, as recited herein, is equal to $$\left|\frac{d\sigma}{dx}\right|.$$

More specifically, the slope m represents the absolute value of the slope of a profile for which the compressive stress generally decreases as a function of increasing depth.

Described herein are glass articles that are chemically strengthened by ion exchange to obtain a prescribed compressive stress profile and thus achieve survivability when dropped onto a hard, abrasive surface from a prescribed height.

Compressive stress CS and depth of layer DOL are stress profile parameters that have been used for years to enable quality control of chemical strengthening. Compressive stress CS provides an estimate of the surface compression, an important parameter that correlates well with the amount of stress that needs to be applied to cause a failure of a glass article, particularly when the glass is free of substantially deep mechanical flaws. Depth of layer DOL has been used as an approximate measure of the depth of penetration of the larger (strengthening) cation (e.g., $K^+$ during $K^+$ for $Na^+$ exchange), with larger DOL correlating well with greater depths of the compression layer, protecting the glass by arresting deeper flaws, and preventing flaws from causing failure under conditions of relatively low externally applied stress.

Even with minor to moderate bending of a glass article, the bending moment induces a stress distribution that is generally linear with depth from the surface, having a maximum tensile stress on the outer side of bending, a maximum compressive stress on the inner side of the bending, and zero stress at the so-called neutral surface, which is usually in the interior. For tempered glass parts, this bending-induced constant-slope stress distribution is added to the tempering stress profile to result in the net stress profile in the presence of external (bending) stress.

The net profile in the presence of bending-induced stress generally has a different depth of compression DOC from the stress profile without bending. In particular, on the outer side of bending, the depth of compression DOC is reduced in the presence of bending. If the tempering stress profile has a relatively small stress slope at depths in the vicinity of and smaller than the DOC, the DOC can drop very substantially in the presence of bending. In the net stress profile, the tips of moderately deep flaws could be exposed to tension, while the same flaw tips would normally be arrested in the compression region of the tempering profile without bending. These moderately deep flaws can thus grow and lead to fracture during the bending.

Bending stresses are also important during drop testing. Regions of localized time-varying stress occur during mechanical vibrations and wave propagation through the glass article. With increasing drop height, the glass article experiences higher time-varying stresses during contact with the floor surface as well as during vibrations occurring after contact. Thus, some fracture failures may occur due to excessive post-contact tensile stress occurring at the tip of a relatively shallow flaw that would normally be innocuous in the presence of tempering without these time-varying stresses.

The present disclosure describes a range of slopes that provides a good trade-off between performance of the glass article during drop tests and during bending tests. The preferable ranges may in some cases be partially defined or limited by the capabilities and limitations of stress measurement equipment (such as, for example, the FSM-6000 stress meter) for collection and interpretation of spectra associated with these profiles for the purposes of quality control during production. Not only the depth of layer DOL, but also the slope of the stress profile (through the slope of the index profile associated with the stress profile), affect the ability to resolve particular lines in the coupling spectra, and thus to control product quality effectively.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. The compressive layer extends from the surface to a depth within the glass.

A cross-sectional schematic view of a planar ion exchanged glass article is shown in FIG. 1. Glass article 100 has a thickness t, first surface 110, and second surface 112. In some embodiments, glass article 100 has a thickness t of at least 0.15 mm and up to about (i.e., less than or equal to) about 2.0 mm, or up to about 1.0 mm, or up to about 0.7 mm, or up to about 0.5 mm. While the embodiment shown in FIG. 1 depicts glass article 100 as a flat planar sheet or plate, glass article 100 may have other configurations, such as a three dimensional shape or another non-planar configuration. Glass article 100 has a first compressive region 120 extending from first surface 110 to a depth of compression (DOC) $d_1$ into the bulk of the glass article 100. In the embodiment shown in FIG. 1, glass article 100 also has a second compressive region 122 extending from second surface 112 to a second depth of compression (DOC) $d_2$. Glass article 100 also has a central region 130 that extends from $d_1$ to $d_2$. Central region 130 is under a tensile stress, having a maximum value at the center of the central region 130, referred to as central tension or center tension (CT). The tensile stress of region 130 balances or counteracts the compressive stresses of regions 120 and 122. The depths $d_1$, $d_2$ of first and second compressive regions 120, 122 protect the glass article 100 from the propagation of flaws introduced by sharp impact to first and/or second surfaces 110, 112 of glass article 100, while the compressive stress CS minimizes the likelihood of a flaw growing and penetrating through the depth $d_1$, $d_2$ of first and second compressive regions 120, 122.

Figure 2:
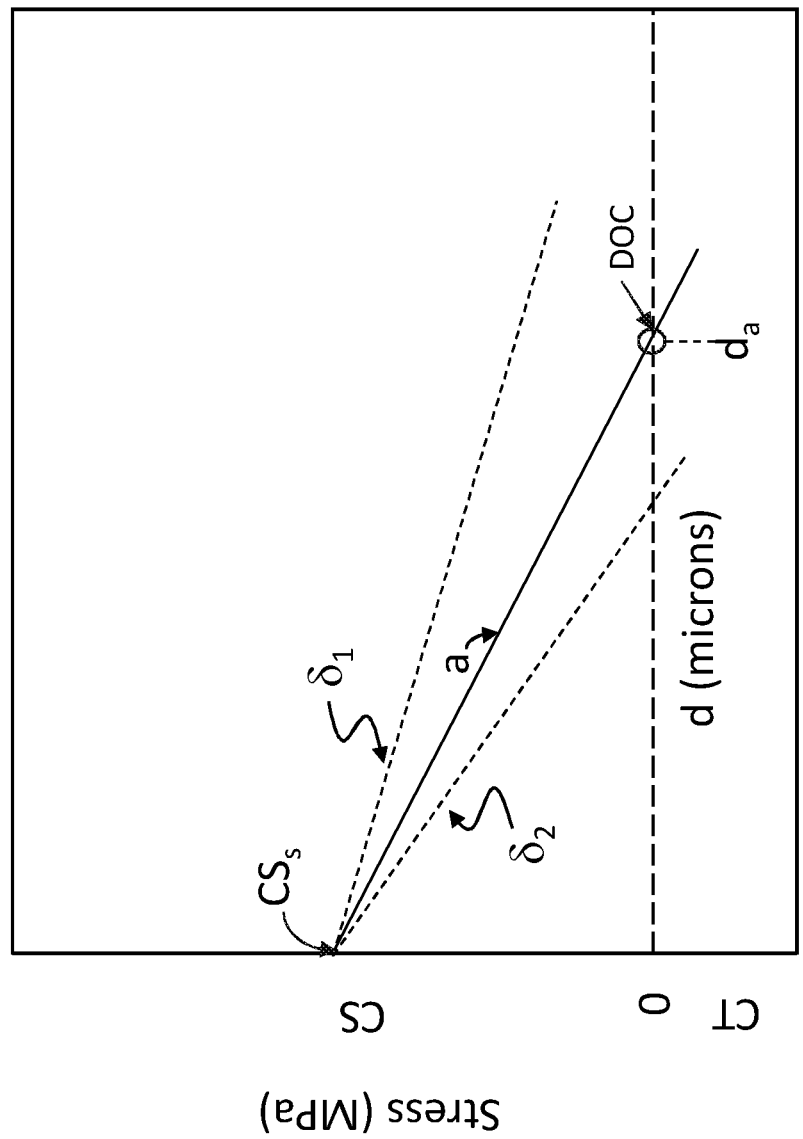
FIG. 2 is a schematic representation of a compressive stress profile obtained by a single step ion exchange process.

The strengthened glass articles described herein have a maximum compressive stress CS of at least about 150 megaPascals (MPa) up to about 400 MPa, or up to about 1000 MPa. In some embodiments, the maximum compressive stress CS is at least about 210 MPa and, in other embodiments, at least about 300 MPa. In some embodiments, the maximum compressive stress CS is located at the surface (110, 112 in FIG. 1). In other embodiments, however, the maximum compressive CS may be located in the compressive region (120, 122) at some depth below the surface of the glass article. Each compressive region (120, 122) extends from the surface of the glass article to a depth of compression DOC ($d_1$, $d_2$) of at least about 50 microns (μm) up to about 100 μm. In some embodiments, DOC is at least about 60 μm. In other embodiments, DOC is at least about 70 μm, in some embodiments, at least about 80 μm, and, in still other embodiments, DOC is at least about 90 μm. In certain embodiments, the depth of compression DOC has a maximum value of about 100 μm. The depth of compression DOC ($d_1$, $d_2$) may also be expressed in terms of the thickness t of the glass article 100. In some embodiments, 0.1·t≤DOC≤0.2·t when t<0.5 mm and, in other embodiments, DOC≥50 μm when t≥0.5 mm The compressive stress varies as a function of depth below the surface of the strengthened glass article, producing a compressive stress profile in the compressive region. In some embodiments, the compressive stress profile is substantially linear from the surface to the depth of compression DOC, as schematically shown in FIG. 2. As seen in FIG. 2, the compressive stress profile a is linear with respect to depth below the surface, resulting in a straight line having a slope $m_a$, expressed in MPa/μm that intercepts the vertical y (CS) axis at $CS_s$. CS profile a intercepts the x axis at the depth of compression DOC. At this point, the total stress (tension+compression) is zero. Below DOC, the glass article is in tension CT, reaching a central value CT. In one non-limiting example, there may be a sub-region over which the tension varies from 0 up to a maximum (by absolute value) tension equal to CT, and a region over which the tension is substantially constant and equal to CT.

In some embodiments, the compressive stress profile a of the glass article described herein has a slope $m_a$ that is within a specified range. In FIG. 2, for example, slope $m_a$ of line a lies between upper boundary $\delta_1$ and lower boundary $\delta_2$; i.e., $\delta_1 \geq m_a \geq \delta_2$. In some embodiments, −2 MPa/μm≥$m_a$≥−200 MPa/μm. In some embodiments, −2 MPa/μm≥$m_a$≥−8 MPa/μm, in some embodiments, −3 MPa/μm≥$m_a$≥−6 MPa/μm, and in still other embodiments, −2 MPa/μm≥$m_a$≥−4.5 MPa/μm.

Figure 3:
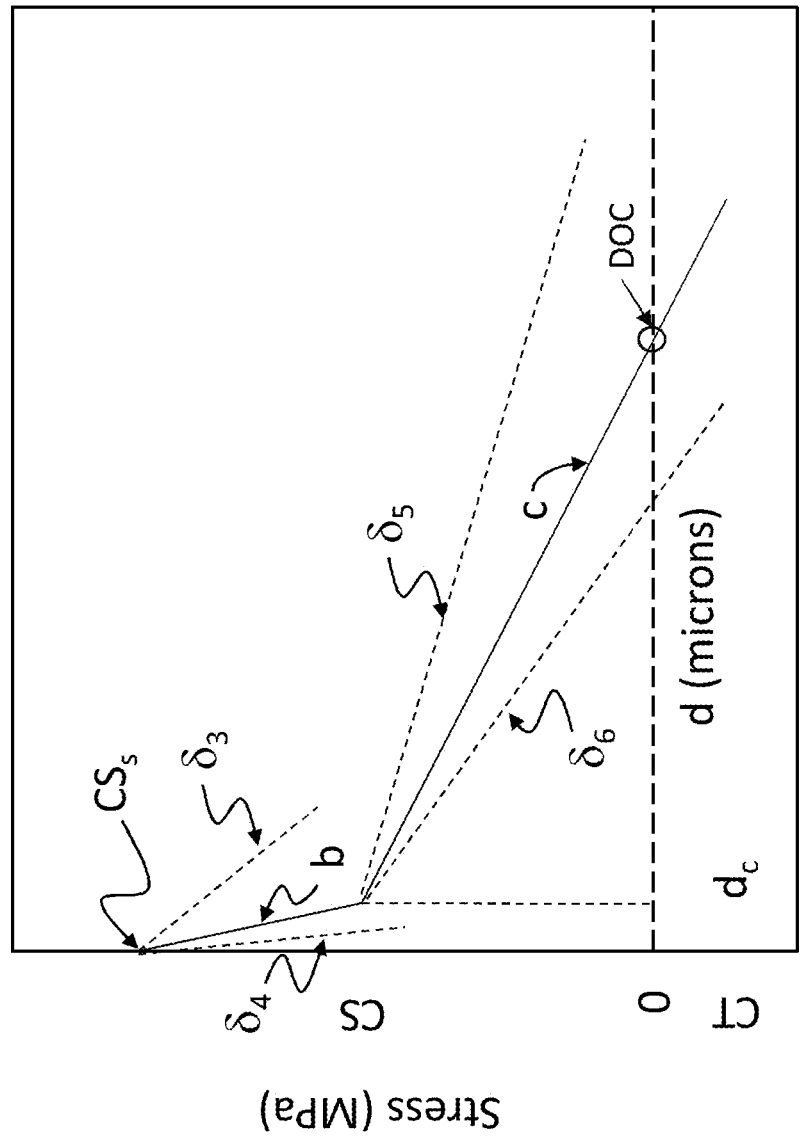
FIG. 3 is a schematic representation of a compressive stress profile obtained by a two-step ion exchange process.

In other embodiments, the compressive stress profile of the glass article described herein comprises two or more substantially linear functions, as schematically shown in FIG. 3. As seen in FIG. 3, the compressive stress profile has a first segment or portion b and a second segment or portion c. First portion b exhibits substantially linear behavior from the strengthened surface of the glass article to a depth $d_b$.

Portion b has a slope $m_b$ and y intercept $CS_s$. Second portion c of the compressive stress profile extends from approximately depth db to the depth of compression DOC, and has a slope $m_c$. The compressive stress $CS(d_b)$ at depth $d_b$ is given by the expression $$CS(d_b) \approx CS_s - d_b(m_b) \qquad (7).$$

In some embodiments, depth $d_b$ is in a range from about 3 µm to about 8 µm; i.e., 3 µm≤$d_b$≤15 µm. In other embodiments, 3 µm≤$d_b$≤10 µm. In still other embodiments, 3 µm≤$d_b$≤12 µm.

It will be appreciated by those skilled in the art that the present disclosure is not limited to compressive stress profiles consisting of only two distinct portions. Instead, the compressive stress profile may include additional segments. In some embodiments, different linear portions or segments of the compressive stress profile may be joined by a transitional region (not shown) in which the slope of the profile transitions from a first slope to a second slope (e.g., from $m_b$ to $m_c$).

As shown in FIG. 3, the slope of portion b of the compressive stress profile is much steeper than the slope of portion c; i.e., $|m_b| \geq |m_c|$. This corresponds to a condition in which a compressive stress profile having a "spike" at the surface of the glass article is created by multiple ion exchange processes carried out in succession in order to provide the surface with sufficient compressive stress to withstand the introduction or growth of some flaws produced through impact.

In some embodiments, the compressive stress profiles b and c of the glass article described herein have slopes $m_b$ and $m_c$, respectively, that are within specified ranges. In FIG. 3, for example, slope $m_b$ of line/first portion b lies between upper boundary $\delta_3$ and lower boundary $\delta_4$ and slope $m_c$ of line/second portion c lies between upper boundary $\delta_5$ and lower boundary $\delta_6$; i.e., $\delta_3 \geq m_b \geq \delta_4$ and $\delta_5 \geq m_c \geq \delta_6$. In some embodiments, $-40$ MPa/µm≥$m_b$≥$-200$ MPa/µm, and $-2$ MPa/µm≥$m_c$≥$-8$ MPa/µm. In some embodiments, $-40$ MPa/µm≥$m_b$≥$-120$ MPa/µm and, in still other embodiments, $-50$ MPa/µm≥$m_b$≥$-120$ MPa/µm.

Compressive stress CS and depth of the compressive layer (referred to as "depth of layer" or DOL) are measured using those means known in the art. Such means include, but are not limited to, measurement of surface stress (FSM) using commercially available instruments such as the FSM-6000, manufactured by Luceo Co., Ltd. (Tokyo, Japan), or the like. Methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient, which is related to the birefringence of the glass. The stress optical coefficient in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The relationship between CS and central tension CT may, in some embodiments, be approximated by the expression:

$$CT = (CS \cdot DOL)/(t - 2\, DOL) \qquad (8),$$

where t is the thickness, expressed in microns (µm), of the glass article. In various sections of the disclosure, central tension CT and compressive stress CS are expressed herein in megaPascals (MPa), thickness t is expressed in either microns (µm) or millimeters (mm), and depth of layer DOL is expressed in microns (µm) or millimeters (mm), consistent with the representation of t.

For strengthened glass articles in which the compressive stress layers extend to deeper depths within the glass, the FSM technique may suffer from contrast issues which affect the observed DOL value. At deeper DOL values, there may be inadequate contrast between the TE and TM spectra, thus making the calculation of the difference between TE and TM spectra—and thus determining the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements such as, for example, ion exchange of sodium for lithium.

The DOL as determined by the FSM is a relatively good approximation for the depth of compression (DOC) when the DOL is a small fraction r of the thickness t and the index profile has a depth distribution with is reasonably well approximated with a simple linear truncated profile. When the DOL is a substantial fraction of the thickness, such as DOL≥0.1·t, then the DOC is most often noticeably lower than the DOL. For example, in the idealized case of a linear truncated profile, the relationship DOC=DOL (1−r) holds, where r=DOL/t.

Most TM and TE index profiles have a curved portion near the bottom of the index profile, and the relationship between DOC and DOL then may be somewhat more involved, but generally the ratio DOC/DOL decreases as r increases. For some profile shapes it is possible to have even DOC≥DOL, particularly when r<0.02.

When the concentration profile of the larger (strengthening) cation (e.g., $K^+$) introduced by ion exchange has two segments, with the segment one nearest the surface having a substantially higher concentration, and the segment spread over large depths and having a substantially lower concentration, the DOL as found by the FSM is significantly smaller than the overall depth of chemical penetration of the larger ion. This is in contrast with the case of a simple one-segment diffusion profile in which the DOL provides a good estimate of the chemical penetration. In a two-segment profile, the DOC may be larger or smaller than the DOL, depending on the depth and stress parameters of the profile and on the thickness.

When low external stresses are applied to a strengthened glass, the fracture-causing flaws have depths that correlate better with the DOC rather than the DOL. The reason why DOL has been used successfully as a high-value parameter of chemical strengthening is that for simple single-segment stress profiles, the DOL has had a good correlation with DOC. In addition, the DOC and the DOL have been similar, since for many years the DOL has been generally lower than 0.1·t, and for the most part lower than 0.05·t. Thus, for traditional chemically-strengthened glass, the DOL has had good correlation with the depth of strength-limiting flaws.

With the increasing importance of thinner cover glasses (e.g., having t<0.5 mm) and the introduction of deeper and more complex stress profiles aimed at improving drop performance while preserving high strength under high-stress tests such as ring-on-ring (ROR), abraded ring-on-ring (AROR), and four-point-bend (4PB), the depth of layer DOL deviates significantly from the depth of compression DOC. Fracture-inducing flaws under conditions of low external stress often occur at depths smaller than the DOL, but are consistent with the DOC.

The techniques described below have been developed to more accurately determine the depth of compression (DOC) and compressive stress profiles for strengthened glass articles.

Two methods for extracting detailed and precise stress profiles (stress as a function of depth) of tempered or chemically strengthened glass are disclosed in U.S. patent application Ser. No. 13/463,322, entitled "Systems And Methods for Measuring the Stress Profile of Ion-Exchanged Glass (hereinafter referred to as "Roussev I")," filed by Rostislav V. Roussev et al. on May 3, 2012, and claiming priority to U.S. Provisional Patent Application No. 61/489,800, having the same title and filed on May 25, 2011. The spectra of bound optical modes for TM and TE polarization are collected via prism coupling techniques and used in their entirety to obtain detailed and precise TM and TE refractive index profiles $n_{TM}(z)$ and $n_{TE}(z)$. In one embodiment, the detailed index profiles are obtained from the mode spectra by using the inverse Wentzel-Kramers-Brillouin (IWKB) method. The contents of the above patent applications are incorporated herein by reference in their entirety.

In another embodiment, the detailed index profiles are obtained by fitting the measured mode spectra to numerically calculated spectra of pre-defined functional forms that describe the shapes of the index profiles and obtaining the parameters of the functional forms from the best fit. The detailed stress profile S(z) is calculated from the difference of the recovered TM and TE index profiles by using a known value of the stress-optic coefficient (SOC):

$$S(z)=[n_{TM}(z)-n_{TE}(z)]/SOC \quad (9).$$

Due to the small value of the SOC, the birefringence $n_{TM}(z)-n_{TE}(z)$ at any depth z is a relatively small fraction (typically on the order of 1%) of either of the indices $n_{TM}(z)$ and $n_{TE}(z)$. Obtaining stress profiles that are not significantly distorted due to noise in the measured mode spectra requires determination of the mode effective indices with precision on the order of 0.00001 RIU (refractive index units). The methods disclosed in Roussev I further include techniques applied to the raw data to ensure such high precision for the measured mode indices, despite noise and/or poor contrast in the collected TE and TM mode spectra or images of the mode spectra. Such techniques include noise-averaging, filtering, and curve fitting to find the positions of the extremes corresponding to the modes with sub-pixel resolution.

Similarly, U.S. patent application Ser. No. 14/033,954, entitled "Systems and Methods for Measuring Birefringence in Glass and Glass-Ceramics (hereinafter "Roussev II")," filed by Rostislav V. Roussev et al. on Sep. 23, 2013, and claiming priority to U.S. Provisional Application Ser. No. 61/706,891, having the same title and filed on Sep. 28, 2012, discloses apparatus and methods for optically measuring birefringence on the surface of glass and glass ceramics, including opaque glass and glass ceramics. Unlike Roussev I, in which discrete spectra of modes are identified, the methods disclosed in Roussev II rely on careful analysis of the angular intensity distribution for TM and TE light reflected by a prism-sample interface in a prism-coupling configuration of measurements. The contents of the above patent applications are incorporated herein by reference in their entirety.

In another disclosed method, derivatives of the TM and TE signals are determined after application of some combination of the aforementioned signal conditioning techniques. The locations of the maximum derivatives of the TM and TE signals are obtained with sub-pixel resolution, and the surface birefringence is proportional to the spacing of the above two maxima, with a coefficient determined as before by the apparatus parameters.

Associated with the requirement for correct intensity extraction, the apparatus comprises several enhancements, such as using a light-scattering surface (static diffuser) in close proximity to or on the prism entrance surface to improve the angular uniformity of illumination, a moving diffuser for speckle reduction when the light source is coherent or partially coherent, and light-absorbing coatings on portions of the input and output facets of the prism and on the side facets of the prism, to reduce parasitic background which tends to distort the intensity signal. In addition, the apparatus may include an infrared light source to enable measurement of opaque materials.

Furthermore, Roussev II discloses a range of wavelengths and attenuation coefficients of the studied sample, where measurements are enabled by the described methods and apparatus enhancements. The range is defined by $\alpha_s \lambda < 250\pi\sigma_s$, where $\alpha_s$ is the optical attenuation coefficient at measurement wavelength $\lambda$, and $\sigma_s$ is the expected value of the stress to be measured with typically required precision for practical applications. This wide range allows measurements of practical importance to be obtained at wavelengths where the large optical attenuation renders previously existing measurement methods inapplicable. For example, Roussev II discloses successful measurements of stress-induced birefringence of opaque white glass-ceramic at a wavelength of 1550 nm, where the attenuation is greater than about 30 dB/mm While it is noted above that there are some issues with the FSM technique at deeper DOL values, FSM is still a beneficial conventional technique which may utilized with the understanding that an error range of up to +/−20% is possible at deeper DOL values. The terms "depth of layer" and "DOL" as used herein refer to DOL values computed using the FSM technique, whereas the terms "depth of compression" and "DOC" refer to depths of the compressive layer determined by the methods described in Roussev I & II.

As stated above, the glass articles may be chemically strengthened by ion exchange. In this process, ions at or near the surface of the glass are replaced by—or exchanged with—larger ions usually having the same valence or oxidation state. In those embodiments in which the glass article comprises, consists essentially of, or consists of an alkali aluminosilicate glass, ions in the surface layer of the glass and the larger ions are monovalent alkali metal cations, such as $Na^+$ (when $Li^+$ is present in the glass), $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, and additional steps such as annealing, washing and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The compressive stress is created by chemically strengthening the glass article, for example, by the ion exchange processes previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

In some embodiments, the glass is strengthened in a single ion exchange step to produce the compressive stress profile shown in FIG. 2. Typically, the glass is immersed in a molten salt bath containing a salt of the larger alkali metal cation. In some embodiments, the molten salt bath contains or consists essentially of salts of the larger alkali metal cation. However, small amounts—in some embodiments, less that about 10 wt %, in some embodiments, less than about 5 wt %, and, in other embodiments less than about 2 wt %—of salts of the smaller alkali metal cation may be present in the bath. In other embodiments, salts of the smaller alkali metal cation may comprise at least about 30 wt %, or at least about 40 wt %, or from about 40 wt % up to about 75 wt % of the ion exchange bath. This single ion exchange process may take place at a temperature of at least about 400° C. and, in some embodiments, at least about 440° C. and less than about 500° C., for a time sufficient to achieve the desired depth of compression DOC. In some embodiments, the single step ion exchange process may be conducted for at least eight hours, depending on the composition of the bath.

In another embodiment, the glass is strengthened in a two-step or dual ion exchange method to produce the compressive stress profile shown in FIG. 3. The first step of the process, the glass is ion exchanged in the first molten salt bath described above. After completion of the first ion exchange, the glass is immersed in a second ion exchange bath. The second ion exchange bath is different—i.e., separate from and, in some embodiments, having a different composition—from the first bath. In some embodiments, the second ion exchange bath contains only salts of the larger alkali metal cation, although, in some embodiments small amounts of the smaller alkali metal cation (e.g., ≤2 wt %; ≤3 wt %) may be present in the bath. In addition, the immersion time and temperature of the second ion exchange step may differ from those of the first ion exchange step. In some embodiments, the second ion exchange step is carried out at a temperature of at least about 350° C. and, in other embodiments, at least about 380° C. up to about 450° C. The duration of the second ion exchange step is sufficient to achieve the desired depth $d_b$ of the shallow segment b, in some embodiments, may be 30 minutes or less. In other embodiments, the duration of the second ion exchange step is 15 minutes or less and, in some embodiments, in a range from about 10 minutes to about 60 minutes.

The second ion exchange bath is different than the first ion exchange bath, because the second ion exchange step is directed to delivering a different concentration of the larger cation or, in some embodiments, a different cation altogether, to the alkali aluminosilicate glass article than that provided in the first ion exchange step. In one or more embodiments, the second ion exchange bath may comprise at least about 95% by weight of a potassium composition that delivers potassium ions to the alkali aluminosilicate glass article. In a specific embodiment, the second ion exchange bath may comprise from about 98% to about 99.5% by weight of the potassium composition. While it is possible that the second ion exchange bath only comprises at least one potassium salt, the second ion exchange bath may, in further embodiments, comprise 0-5% by weight, or about 0.5-2.5% by weight of at least one sodium salt, for example, $NaNO_3$. In an exemplary embodiment, the potassium salt is $KNO_3$. In further embodiments, the temperature of the second ion exchange step may be 380° C. or greater and, in some embodiments, up to about 450° C.

The purpose of the second ion exchange step is to form a "spike" increase the compressive stress in the region immediately adjacent to the surface of the glass article, as represented by portion b of the stress profile shown in FIG. 3.

The glass articles described herein may comprise or consist essentially of any glass that is chemically strengthened by ion exchange. In some embodiments, the glass is an alkali aluminosilicate glass.

In one embodiment, the alkali aluminosilicate glass comprises or consists essentially of at least one of alumina and boron oxide, and at least one of an alkali metal oxide and an alkali earth metal oxide, wherein $-15$ mol %$\leq (R_2O+R'O-Al_2O_3-ZrO_2)-B_2O_3 \leq 4$ mol %, where R is one of Li, Na, K, Rb, and Cs, and R' is at least one of Mg, Ca, Sr, and Ba. In some embodiments, the alkali aluminosilicate glass comprises or consists essentially of: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. In some embodiments, the glass comprises alumina and boron oxide and at least one alkali metal oxide, wherein −15 mol %≤($R_2O$+R'O−$Al_2O_3$−$ZrO_2$)−$B_2O_3$≤4 mol %, where R is at least one of Li, Na, K, Rb, and Cs, and R' is at least one of Mg, Ca, Sr, and Ba; wherein 10≤$Al_2O_3$+$B_2O_3$+$ZrO_2$≤30 and 14≤$R_2O$+R'O≤25; wherein the silicate glass comprises or consists essentially of: 62-70 mol. % $SiO_2$; 0-18 mol % $Al_2O_3$; 0-10 mol % $B_2O_3$; 0-15 mol % $Li_2O$; 6-14 mol % $Na_2O$; 0-18 mol % $K_2O$; 0-17 mol % MgO; 0-18 mol % CaO; and 0-5 mol % $ZrO_2$. The glass is described in U.S. patent application Ser. No. 12/277,573 filed Nov. 25, 2008, by Matthew J. Dejneka et al., and entitled "Glasses Having Improved Toughness And Scratch Resistance," and U.S. Pat. No. 8,652,978 filed Aug. 17, 2012, by Matthew J. Dejneka et al., and entitled "Glasses Having Improved Toughness And Scratch Resistance," both claiming priority to U.S. Provisional Patent Application No. 61/004,677, filed on Nov. 29, 2008. The contents of all of the above patent and patent application are incorporated herein by reference in their entirety.

In another embodiment, the alkali aluminosilicate glass comprises or consists essentially of: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O$+$Na_2O$+$K_2O$≤20 mol % and 0 mol %≤MgO+CaO≤10 mol %. In some embodiments, the alkali aluminosilicate glass comprises or consists essentially of: 60-70 mol % $SiO_2$; 6-14 mol % $Al_2O_3$; 0-3 mol % $B_2O_3$; 0-1 mol % $Li_2O$; 8-18 mol % $Na_2O$; 0-5 mol % $K_2O$; 0-2.5 mol % CaO; greater than 0 mol % to 3 mol % $ZrO_2$; 0-1 mol % $SnO_2$; and 0-1 mol % $CeO_2$, wherein 12 mol %<$Li_2O$+$Na_2O$+$K_2O$≤20 mol %, and wherein the silicate glass comprises less than 50 ppm $As_2O_3$. In some embodiments, the alkali aluminosilicate glass comprises or consists essentially of: 60-72 mol % $SiO_2$; 6-14 mol % $Al_2O_3$; 0-3 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol %≤$Li_2O$+$Na_2O$+$K_2O$≤20 mol %, and wherein the silicate glass comprises less than 50 ppm $As_2O_3$ and less than 50 ppm $Sb_2O_3$. The glass is described in U.S. Pat. No. 8,158,543 by Sinue Gomez et al., entitled "Fining Agents for Silicate Glasses," filed on Feb. 25, 2009; U.S. Pat. No. 8,431,502 by Sinue Gomez et al., entitled "Silicate Glasses Having Low Seed Concentration," filed Jun. 13, 2012; and U.S. Pat. No. 8,623,776, by Sinue Gomez et al., entitled "Silicate Glasses Having Low Seed Concentration," filed Jun. 19, 2013, all of which claim priority to U.S. Provisional Patent Application No. 61/067,130, filed on Feb. 26, 2008. The contents of all of the above U.S. patents are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises or consists essentially of: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and from 0 mol % to about 3 mol % CaO. The glass is described in U.S. Pat. No. 8,802,581 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009. The contents of the above patent and patent application are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σalkali metal modifiers (mol %))]>1. In some embodiments, the alkali aluminosilicate glass comprises or consists essentially of: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. In some embodiments, the glass comprises or consists essentially of: at least 58 mol % $SiO_2$; at least 8 mol % $Na_2O$; from 5.5 mol % to 12 mol % $B_2O_3$; and $Al_2O_3$, wherein [($Al_2O_3$ (mol %)+$B_2O_3$(mol %))/(Σalkali metal modifiers (mol %))]>1, $Al_2O_3$(mol %)>$B_2O_3$(mol %), 0.9<$R_2O$/$Al_2O_3$<1.3. The glass is described in U.S. Pat. No. 8,586,492, entitled "Crack And Scratch Resistant Glass and Enclosures Made Therefrom," filed Aug. 18, 2010, by Kristen L. Barefoot et al., and U.S. patent application Ser. No. 14/082,847, entitled "Crack And Scratch Resistant Glass and Enclosures Made Therefrom," filed Nov. 18, 2013, by Kristen L. Barefoot et al., both claiming priority to U.S. Provisional Patent Application No. 61/235,767, filed on Aug. 21, 2009. The contents of the above patent and patent applications are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein 0.75≤[($P_2O_5$(mol %)+$R_2O$(mol %))/$M_2O_3$ (mol %)]≤1.2, where $M_2O_3$=$Al_2O_3$+$B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010. The contents of the above patent applications are incorporated herein by reference in their entirety.

In still another embodiment, the alkali aluminosilicate glass comprises at least about 50 mol % $SiO_2$ and at least about 11 mol % $Na_2O$, and has a surface compressive stress of at least about 900 MPa. In some embodiments, the glass further comprises $Al_2O_3$ and at least one of $B_2O_3$, $K_2O$, MgO and ZnO, wherein −340+27.1.$Al_2O_3$−28.7.$B_2O_3$+15.6.$Na_2O$−61.4.$K_2O$+8.1.(MgO+ZnO)≤0 mol %. In particular embodiments, the glass comprises or consists essentially of: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol %

K$_2$O; from 0 mol % to about 8.5 mol % MgO; and from 0 mol % to about 1.5 mol % CaO. The glass is described in U.S. patent application Ser. No. 13/533,298, by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011. The contents of the above patent applications are incorporated herein by reference in their entirety.

In other embodiments, the alkali aluminosilicate glass is ion exchangeable and comprises: at least about 50 mol % SiO$_2$; at least about 10 mol % R$_2$O, wherein R$_2$O comprises Na$_2$O; Al$_2$O$_3$; and B$_2$O$_3$, wherein B$_2$O$_3$-(R$_2$O-Al$_2$O$_3$)≥3 mol %. In some embodiments, the glass comprises: at least about 50 mol % SiO$_2$; at least about 10 mol % R$_2$O, wherein R$_2$O comprises Na$_2$O; Al$_2$O$_3$, wherein Al$_2$O$_3$(mol %)<R$_2$O (mol %); and from 3 mol5 to 4.5 mol % B$_2$O$_3$, wherein B$_2$O$_3$(mol %)-(R$_2$O(mol %)-Al$_2$O$_3$(mol %))≤3 mol %. In certain embodiments, the glass comprises or consists essentially of: at least about 50 mol % SiO$_2$; from about 9 mol % to about 22 mol % Al$_2$O$_3$; from about 3 mol % to about 10 mol % B$_2$O$_3$; from about 9 mol % to about 20 mol % Na$_2$O; from 0 mol % to about 5 mol % K$_2$O; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %. When ion exchanged, the glass, in some embodiments, has a Vickers crack initiation threshold of at least about 10 kgf. Such glasses are described in U.S. patent application Ser. No. 14/197,658, filed May 28, 2013, by Matthew J. Dejneka et al., entitled "Zircon Compatible, Ion Exchangeable Glass with High Damage Resistance," which is a continuation of U.S. patent application Ser. No. 13/903,433, filed May 28, 2013, by Matthew J. Dejneka et al., entitled "Zircon Compatible, Ion Exchangeable Glass with High Damage Resistance," both claiming priority to Provisional Patent Application No. 61/653,489, filed May 31, 2012. The contents of these patent applications are incorporated herein by reference in their entirety.

In some embodiments, the glass comprises: at least about 50 mol % SiO$_2$; at least about 10 mol % R$_2$O, wherein R$_2$O comprises Na$_2$O; Al$_2$O$_3$, wherein −0.5 mol %≤Al$_2$O$_3$(mol %)-R$_2$O(mol %)≤2 mol %; and B$_2$O$_3$, and wherein B$_2$O$_3$(mol %)-(R$_2$O(mol %)-Al$_2$O$_3$(mol %))≥4.5 mol %. In other embodiments, the glass has a zircon breakdown temperature that is equal to the temperature at which the glass has a viscosity of greater than about 40 kPoise and comprises: at least about 50 mol % SiO$_2$; at least about 10 mol % R$_2$O, wherein R$_2$O comprises Na$_2$O; Al$_2$O$_3$; and B$_2$O$_3$, wherein B$_2$O$_3$(mol %)-(R$_2$O(mol %)-Al$_2$O$_3$(mol %))≥4.5 mol %. In still other embodiments, the glass is ion exchanged, has a Vickers crack initiation threshold of at least about 30 kgf, and comprises: at least about 50 mol % SiO$_2$; at least about 10 mol % R$_2$O, wherein R$_2$O comprises Na$_2$O; Al$_2$O$_3$, wherein −0.5 mol %≤Al$_2$O$_3$(mol %)-R$_2$O(mol %)≤2 mol %; and B$_2$O$_3$, wherein B$_2$O$_3$(mol %)-(R$_2$O(mol %)-Al$_2$O$_3$ (mol %))≥4.5 mol %. Such glasses are described in U.S. patent application Ser. No. 13/903,398, by Matthew J. Dejneka et al., entitled "Ion Exchangeable Glass with High Damage Resistance," filed May 28, 2013, claiming priority from U.S. Provisional Patent Application No. 61/653,485, filed May 31, 2012. The contents of these patent applications are incorporated herein by reference in their entirety.

In certain embodiments, the alkali aluminosilicate glass comprises at least about 4 mol % P$_2$O$_5$, wherein (M$_2$O$_3$(mol %)/R$_x$O (mol %))<1, wherein M$_2$O$_3$=Al$_2$O$_3$+B$_2$O$_3$, and wherein R$_x$O is the sum of monovalent and divalent cation oxides present in the alkali aluminosilicate glass. In some embodiments, the monovalent and divalent cation oxides are selected from the group consisting of Li$_2$O, Na$_2$O, K$_2$O, Rb$_2$O, Cs$_2$O, MgO, CaO, SrO, BaO, and ZnO. In some embodiments, the glass is lithium-free and consists essentially of from about 40 mol % to about 70 mol % SiO$_2$; from about 11 mol % to about 25 mol % Al$_2$O$_3$; from about 4 mol % to about 15 mol % P$_2$O$_5$; from about 13 mol % to about 25 mol % Na$_2$O; from about 13 to about 30 mol % R$_x$O, where wherein R$_x$O is the sum of the alkali metal oxides, alkaline earth metal oxides, and transition metal monoxides present in the glass; from about 11 to about 30 mol % M$_2$O$_3$, where M$_2$O$_3$=Al$_2$O$_3$+B$_2$O$_3$; from 0 mol % to about 1 mol % K$_2$O; from 0 mol % to about 4 mol % B$_2$O$_3$, and 3 mol % or less of one or more of TiO$_2$, MnO, Nb$_2$O$_5$, MoO$_3$, Ta$_2$O$_5$, WO$_3$, ZrO$_2$, Y$_2$O$_3$, La$_2$O$_3$, HfO$_2$, CdO, SnO$_2$, Fe$_2$O$_3$, CeO$_2$, As$_2$O$_3$, Sb$_2$O$_3$, Cl, and Br; the glass is lithium-free; and 1.3<[(P$_2$O$_5$+R$_2$O)/M$_2$O$_3$]≤2.3, where R$_2$O is the sum of monovalent cation oxides present in the glass. The glass is described in U.S. patent application Ser. No. 13/678,013 by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and applications are incorporated herein by reference in their entirety.

In other embodiments, the alkali aluminosilicate glass comprises: from about 50 mol % to about 72 mol % SiO$_2$; from about 12 mol % to about 22 mol % Al$_2$O$_3$; up to about 15 mol % B$_2$O$_3$; up to about 1 mol % P$_2$O$_5$; from about 11 mol % to about 21 mol % Na$_2$O; up to about 5 mol % K$_2$O; up to about 4 mol % MgO; up to about 5 mol % ZnO; and up to about 2 mol % CaO. In some embodiments, the glass comprises: from about 55 mol % to about 62 mol % SiO$_2$; from about 16 mol % to about 20 mol % Al$_2$O$_3$; from about 4 mol % to about 10 mol % B$_2$O$_3$; from about 14 mol % to about 18 mol % Na$_2$O; from about 0.2 mol % to about 4 mol % K$_2$O; up to about 0.5 mol % MgO; up to about 0.5 mol % ZnO; and up to about 0.5 mol % CaO, wherein the glass is substantially free of P$_2$O$_5$. In some embodiments, Na$_2$O+K$_2$O-Al$_2$O$_3$≤2.0 mol % and, in certain embodiments Na$_2$O+K$_2$O-Al$_2$O$_3$≤0.5 mol %. In some embodiments, B$_2$O$_3$-(Na$_2$O+K$_2$O-Al$_2$O$_3$)>4 mol % and, in certain embodiments, B$_2$O$_3$-(Na$_2$O+K$_2$O-Al$_2$O$_3$)>1 mol %. In some embodiments, 24 mol %≤RAlO$_4$≤45 mol %, and, in other embodiments, 28 mol %≤RAlO$_4$≤45 mol %, where R is at least one of Na, K, and Ag. The glass is described in U.S. Provisional Patent Application No. 61/909,049 by Matthew J. Dejneka et al., entitled "Fast Ion Exchangeable Glasses with High Indentation Threshold," filed Nov. 26, 2013, the contents of which are incorporated herein by reference in their entirety.

In some embodiments, the glasses described herein are substantially free of at least one of arsenic, antimony, barium, strontium, bismuth, and their compounds. In other embodiments, the glasses may include up to about 0.5 mol % Li$_2$O, or up to about 5 mol % Li$_2$O or, in some embodiments, up to about 10 mol % Li$_2$O. in still other embodiments, the glass may be free of Li$_2$O.

In some embodiments, the glasses described herein, when ion exchanged, are resistant to introduction of flaws by sharp or sudden impact. Accordingly, these ion exchanged glasses exhibit Vickers crack initiation threshold of at least about 10 kilogram force (kgf). In certain embodiments, these glasses exhibit a Vickers crack initiation threshold of at least 20 kgf and, in some embodiments, at least about 30 kgf, and up to 50 kgf.

The glasses described herein may, in some embodiments, be down-drawable by processes known in the art, such as slot-drawing, fusion drawing, re-drawing, and the like, and have a liquidus viscosity of at least 130 kilopoise. In addition to those compositions listed hereinabove, various other ion exchangeable alkali aluminosilicate glass compositions may be used.

The strengthened glasses described herein are considered suitable for various two- and three-dimensional shapes and may be utilized in various applications, and various thicknesses are contemplated herein. In some embodiments, the glass article has a thickness in a range from about 0.1 mm up to about 2.0 mm. In some embodiments, the glass article has a thickness in a range from about 0.1 mm up to about 1.0 mm and, in certain embodiments, from about 0.1 mm up to about 0.5 mm Strengthened glass articles may also be defined by their central tension CT. In one or more embodiments, the strengthened glass articles described herein have a CT≤150 MPa, or a CT≤125 MPa, or CT≤100 MPa. The central tension of the strengthened glass correlates to the frangible behavior of the strengthened glass article.

In another aspect, a method of making a strengthened glass article having at least one compressive stress layer extending from a surface of the strengthened glass article to a depth of compression DOC of at least about 45 µm is provided. The method includes a first ion exchange step in which an alkali aluminosilicate glass article is immersed in a first ion exchange bath at a temperature of greater than 400° C. for a time sufficient such that the compressive stress layer has a depth of compression of at least about 45 µm after the first ion exchange step. In some embodiments, it is preferable that the depth of compression achieved after the first step be at least 50 µm. Even more preferable are compression depths DOC greater than 55 µm, or even 60 µm, particularly if the thickness of the glass exceeds 0.5 mm. In some embodiments, the depth of compression DOC of an individual compressive layer (e.g., 120 in FIG. 1) is at least about 0.1·t, and in other embodiments, at least about 0.15·t, and may be as great as 0.20·t.

Actual immersion times in the first ion exchange bath may depend upon factors such as the temperature and/or composition of the ion exchange bath, the diffusivity of the cations within the glass, and the like. Accordingly, various time periods for ion exchange are contemplated as being suitable. In those instances in which potassium cations from the ion exchange bath are exchanged for sodium cations in the glass, the bath typically comprises potassium nitrate ($KNO_3$). Here, the first ion exchange step, in some embodiments, may be conducted for a time of at least 5 hours. Longer ion exchange periods for the first ion exchange step may correlate with larger sodium ion contents in the first ion exchange bath. The desired sodium ion content in first ion exchange bath may be achieved, for example, by including at least about 30% by weight or, in some embodiments, at least about 40% by weight of a sodium compound such as sodium nitrate ($NaNO_3$) or the like in the first ion exchange bath. In some embodiments, the sodium compound accounts for about 40% to about 60% by weight of the first ion exchange bath. In an exemplary embodiment, the first ion exchange step is carried out at a temperature of about 440° C. or greater.

After the first ion exchange step is performed, the strengthened glass article may have a maximum compressive stress (CS) of at least 150 MPa. In further embodiments, the strengthened glass article may have a CS of at least 200 MPa after the first ion exchange step, or a CS range of about 200 to about 400 MPa after the first ion exchange step. While the first ion exchange step minimally achieves a compressive layer depth/depth of compression DOC of at least 45 µm, it is contemplated that the compressive stress layer may have a depth of 50 µm to 100 µm and, in some embodiments, 60 µm to 100 µm after the first ion exchange step.

Following the first ion exchange step, a second ion exchange step may be conducted by immersing the alkali aluminosilicate glass article in a second ion exchange bath at a temperature of at least 350° C. and up to about 450° C. for a time sufficient to produce the shallow steep segment with a depth $d_b$ of at least about 3 µm and up to about 15 µm. In some embodiments, the second ion exchange bath differs in composition and/or temperature from the first ion exchange bath.

The second ion exchange step is a relatively rapid ion exchange step that yields a "spike" of compressive stress near the surface of the glass as depicted in FIG. 3. In one or more embodiments, the second ion exchange step may be conducted for a time of up to about 30 minutes or, in other embodiments, up to about 15 minutes or, in some embodiments, in a range from about 10 minutes to about 60 minutes.

The second ion exchange step is directed to delivering a different ion to the alkali aluminosilicate glass article than the ion provided by the first ion exchange step. The composition of the second ion exchange bath therefore differs from the first ion exchange bath. In some embodiments, the second ion exchange bath comprises at least about 95% by weight of a potassium composition (e.g., $KNO_3$) that delivers potassium ions to the alkali aluminosilicate glass article. In a specific embodiment, the second ion exchange bath may comprise from about 98% to about 99.5% by weight of the potassium composition. While it is possible that the second ion exchange bath only contains a potassium salt, the second ion exchange bath may, in further embodiments, comprise up to about 2% by weight or from about 0.5% to about 1.5% by weight of a sodium salt such as, for example, $NaNO_3$. In further embodiments, the temperature of the second ion exchange step may be 390° C. or greater and up to about 450° C.

In some embodiments, the second ion exchange step may conclude the chemical strengthening procedure. The strengthened glass article may have a compressive stress (CS) of at least about 700 MPa following the second ion exchange step. In a further embodiment, the strengthened glass article has a maximum compressive stress of about 500 to about 1200 MPa, or about 700 to 1000 MPa after the second ion exchange step. While the second ion exchange step minimally achieves a compressive layer DOC of at least about 70 µm, it is contemplated that the compressive stress layer may have a DOC in a range from about 90 µm to aboutl 30 µm after the second ion exchange step.

Frangible behavior is characterized by at least one of: breaking of the strengthened glass article (e.g., a plate or sheet) into multiple small pieces (e.g., 1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Figure 13A:
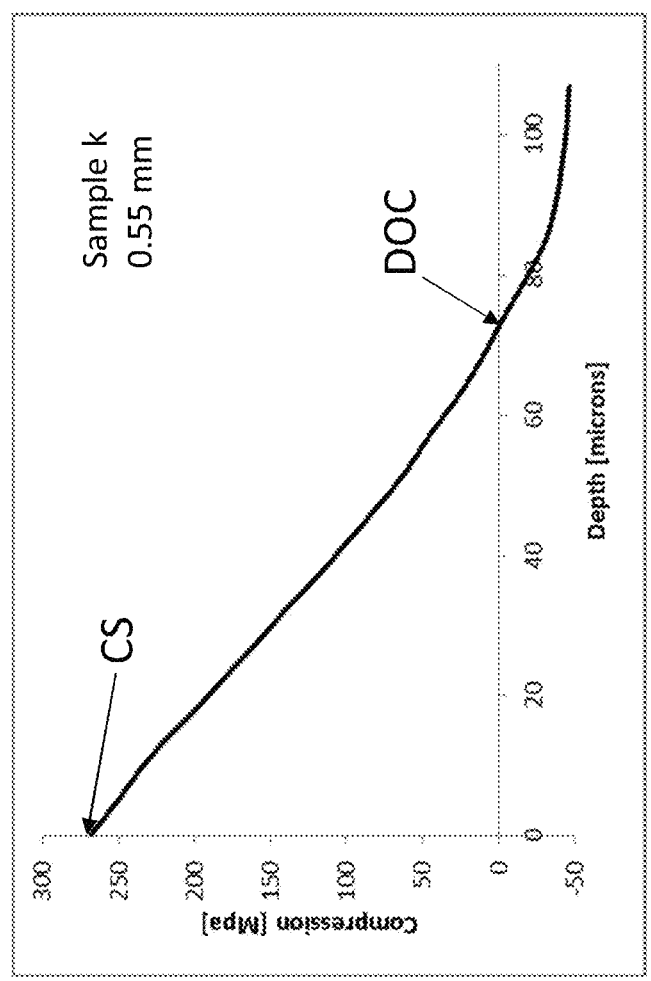
FIG. 13a is a plot of the compressive stress profile for ion exchanged glass sample k having a thickness of 0.55 mm.
Figure 13B:
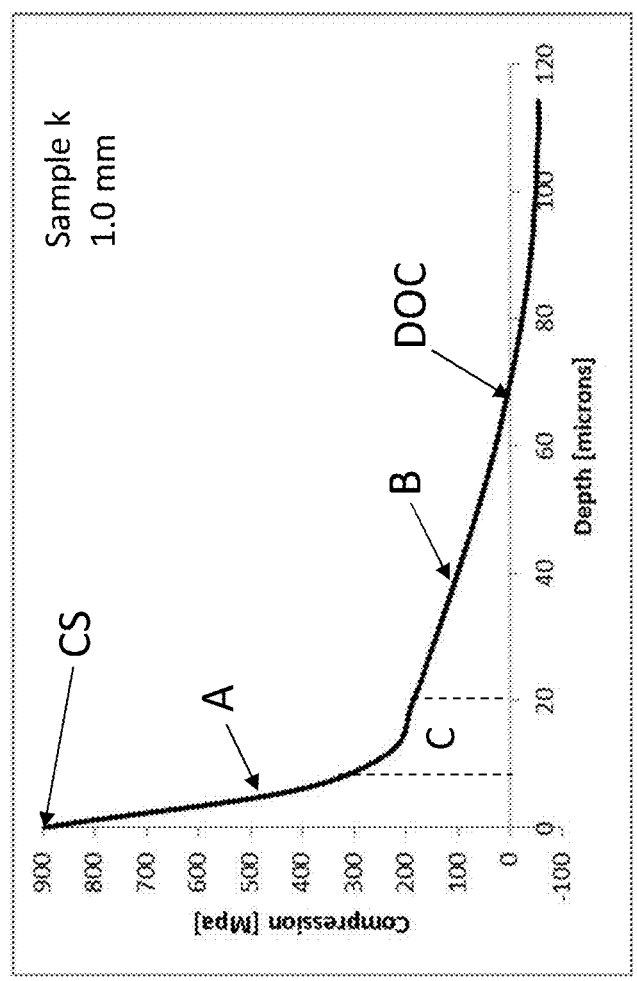
FIG. 13b is a plot of the compressive stress profile determined for the sample of FIG. 13a following a second ion exchange step.

Examples of frangible behavior and non-frangible behavior of strengthened glass articles upon point impact with a scribe having a sharp tungsten carbide (WC) tip are shown in FIGS. 13a and 13b. The point impact test that is used to determine frangible behavior includes an apparatus that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT. The impact energy needed to create or activate the crack in a strengthened glass sheet depends upon the compressive stress CS and depth of layer DOL of the article, and thus upon the conditions under which the sheet was strengthened (i.e., the conditions used to strengthen a glass by ion exchange). Otherwise, each ion exchanged glass plate shown in FIGS. 13a and 13b was subjected to a sharp dart indenter (e.g., a scribe with a sharp WC point) contact sufficient to propagate a crack into the inner region of the plate, the inner region being under tensile stress. The force applied to the glass plate was just sufficient to reach the beginning of the inner region, thus allowing the energy that drives the crack to come from the tensile stresses in the inner region rather than from the force of the dart impact on the outer surface. The degree of ejection may be determined, for example, by centering the glass sample on a grid, impacting the sample and measuring the ejection distance of individual pieces using the grid.

Figure 14A:
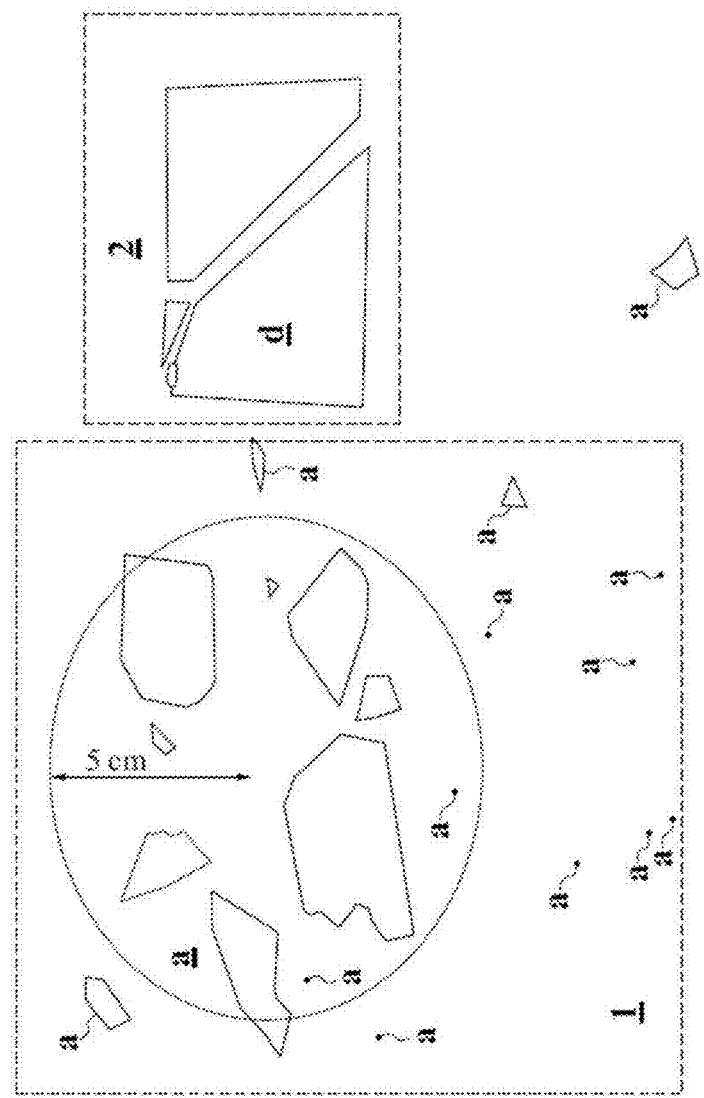
FIG. 14a is a graphical representation of a photograph showing strengthened glass articles 1) exhibiting frangible behavior upon fragmentation; and 2) exhibiting non-frangible behavior upon fragmentation.

Referring to FIG. 14a, glass plate a can be classified as being frangible. In particular, glass plate a fragmented into multiple small pieces that were ejected, and exhibited a large degree of crack branching from the initial crack to produce the small pieces. Approximately 50% of the fragments are less than 1 mm in size, and it is estimated that about 8 to 10 cracks branched from the initial crack. Glass pieces were also ejected about 5 cm from original glass plate a, as seen in FIG. 14a. A glass article that exhibits any of the three criteria (i.e., multiple crack branching, ejection, and extreme fragmentation) described hereinabove is classified as being frangible. For example, if a glass exhibits excessive branching alone but does not exhibit ejection or extreme fragmentation as described above, the glass is still characterized as frangible.

Figure 14B:
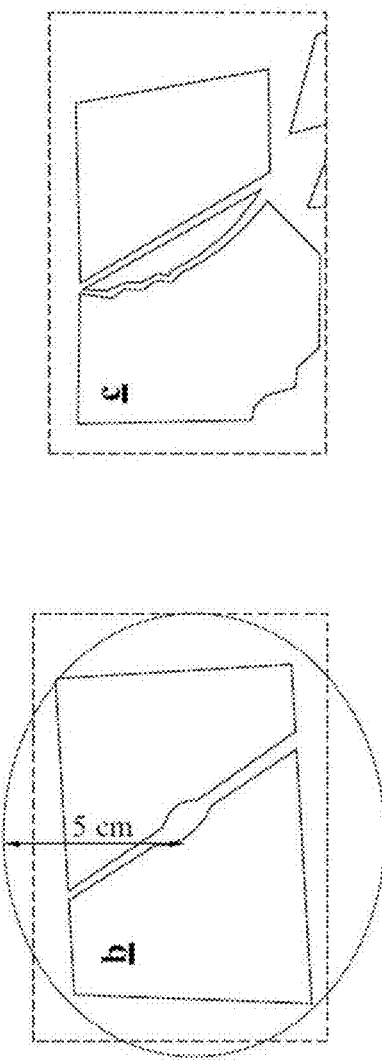
FIG. 14b is a graphical representation of a photograph showing strengthened glass sheets that exhibit non-frangible behavior upon fragmentation.

Glass plates b, c, (FIG. 14b) and d (FIG. 14a) are classified as not frangible. In each of these samples, the glass sheet has broken into a small number of large pieces. Glass plate b (FIG. 14), for example, has broken into two large pieces with no crack branching; glass plate c (FIG. 14b) has broken into four pieces with two cracks branching from the initial crack; and glass plate d (FIG. 14a) has broken into four pieces with two cracks branching from the initial crack. Based on the absence of ejected fragments (i.e., no glass pieces forcefully ejected more than 2 inches from their original location), no visible fragments that are less than or equal to 1 mm in size, and the minimal amount of observed crack branching, samples b, c, and d are classified as non-frangible or substantially non-frangible.

Based on the foregoing, a frangibility index (Table 1) can be constructed to quantify the degree of frangible or non-frangible behavior of a glass, glass ceramic, and/or a ceramic article upon impact with another object. Index numbers, ranging from 1 for non-frangible behavior to 5 for highly frangible behavior, have been assigned to describe different levels of frangibility or non-frangibility. Using the index, frangibility can be characterized in terms of numerous parameters: 1) the percentage of the population of fragments having a diameter (i.e., maximum dimension) of less than 1 mm ("Fragment size" in Table 1); 2) the number of fragments formed per unit area (in this instance, $cm^2$) of the sample ("Fragment density" in Table 1); 3) the number of cracks branching from the initial crack formed upon impact ("Crack branching" in Table 1); and 4) the percentage of the population of fragments that is ejected upon impact more than about 5 cm (or about 2 inches) from their original position ("Ejection" in Table 1).

TABLE 1

Criteria for determining the degree of frangibility and frangibility index.

| Degree of frangibility | Frangibility index | Fragment size (% ≤ 1 mm) | Fragment density (fragments/ $cm^2$) | Crack branching | Ejection (% ≥ 5 cm) |
|---|---|---|---|---|---|
| High | 5 | >20 | >7 | >9 | >6 |
| Medium | 4 | 10 < n ≤ 20 | 5 < n ≤ 7 | 7 < n ≤ 9 | 4 < n ≤ 6 |
| Low | 3 | 5 < n ≤ 10 | 3 < n ≤ 5 | 5 < n ≤ 7 | 2 < n ≤ 4 |
| None | 2 | 0 < n ≤ 5 | 1 < n ≤ 3 | 2 < n ≤ 5 | 0 < n ≤ 2 |
|  | 1 | 0 | n ≤ 1 | n ≤ 2 | 0 |

A frangibility index is assigned to a glass article if the article meets at least one of the criteria associated with a particular index value. Alternatively, if a glass article meets criteria between two particular levels of frangibility, the article may be assigned a frangibility index range (e.g., a frangibility index of 2-3). The glass article may be assigned the highest value of frangibility index, as determined from the individual criteria listed in Table 1. In many instances, it is not possible to ascertain the values of each of the criteria, such as the fragmentation density or percentage of fragments ejected more than 5 cm from their original position, listed in Table 1. The different criteria are thus considered individual, alternative measures of frangible behavior and the frangibility index such that a glass article falling within one criteria level will be assigned the corresponding degree of frangibility and frangibility index. If the frangibility index based on any of the four criteria listed in Table 1 is 3 or greater, the glass article is classified as frangible.

Applying the foregoing frangibility index to the samples shown in FIGS. 13a and 13b, glass plate a fragmented into multiple ejected small pieces and exhibited a large degree of crack branching from the initial crack to produce the small pieces. Approximately 50% of the fragments are less than 1 mm in size and it is estimated that about 8 to 10 cracks branched from the initial crack. Based upon the criteria listed in Table 1, glass plate a has a frangibility index of between about 4-5, and is classified as having a medium-high degree of frangibility.

A glass article having a frangibility index of less than 3 (low frangibility) may be considered to be non-frangible or substantially non-frangible. Glass plates b, c, and d each lack fragments having a diameter of less than 1 mm, multiple branching from the initial crack formed upon impact and fragments ejected more than 5 cm from their original position. Glass plates b, c, and d are non-frangible and thus have a frangibility index of 1 (not frangible).

As previously discussed, the observed differences in behavior between glass plate a, which exhibited frangible behavior, and glass plates b, c, and d, which exhibited non-frangible behavior, in FIGS. 13a and 13b can be attributed to differences in central tension CT among the samples tested. The possibility of such frangible behavior is one consideration in designing various glass products, such as cover plates or windows for portable or mobile electronic devices such as cellular phones, entertainment devices, and the like, as well as for displays for information terminal (IT) devices, such as laptop computers. Moreover, the depth of the compression layer DOL and the maximum value of compressive stress CS that can be designed into or provided to a glass article are limited by such frangible behavior.

Accordingly, the strengthened glass articles described herein, in some embodiments, exhibit a frangibility index of less than 3 when subjected to a point impact sufficient to break the strengthened glass article. In other embodiments, non-frangible strengthened glass articles may achieve a frangibility index of less than 2 or less than 1.

The strengthened glass articles described herein demonstrate improved fracture resistance when subjected to repeated drop tests. The purpose of such drop tests is to characterize the performance of such glass articles in normal use as display windows or cover plates for handheld electronic devices such as cell phones, smart phones, and the like.

Figure 15A:
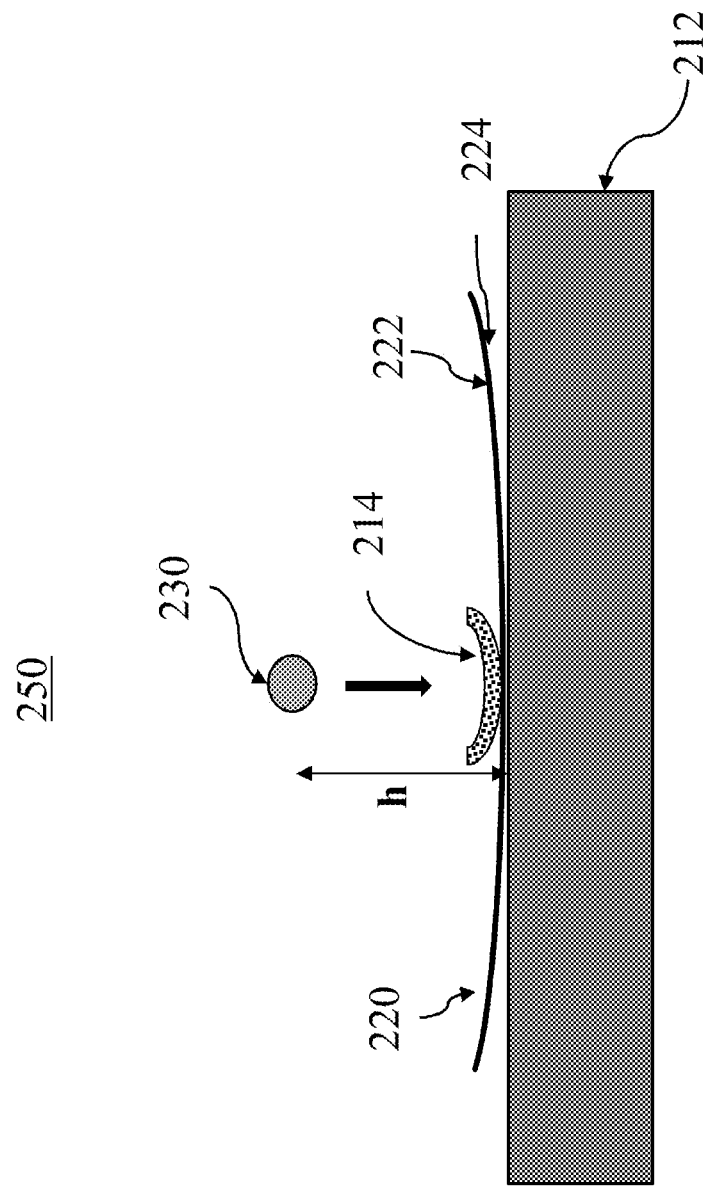
FIG. 15a is a schematic cross-sectional view of prior art apparatus that is used to perform ball drop testing.

A typical ball drop test concept that is currently in use is shown in FIG. 15a. The ball drop test assembly 250 includes a solid, hard substrate 212 such as a granite slab or the like and a steel ball 230 of predetermined mass and diameter. A glass sample 220 is secured to the substrate 212, and a piece of sandpaper 214 having the desired grit is placed on the upper surface of the glass sample 220 opposite the substrate 212. The sandpaper 214 has an upper surface 222 and a lower surface 224. The sandpaper 214 is placed on the glass sample 220 such that a roughened surface of the sandpaper contacts the upper surface 222 of the glass sample 220. The steel ball 230 is allowed to fall freely from a predetermined height h onto the sandpaper 214. The upper surface 222 or compression face of the glass sample 220 makes contact with the roughened surface of the sandpaper 214, introducing cracks into the surface of the upper surface/compression face 222. The height h may be increased incrementally until either a maximum height is reached or the glass sample fractures.

The ball drop test 250 described hereinabove does not represent the true behavior of glass when dropped onto and contacted by a rough surface. Instead, it is known that the face of the glass bends outward in tension, rather than inward in compression as shown in FIG. 15a.

Figure 15B:
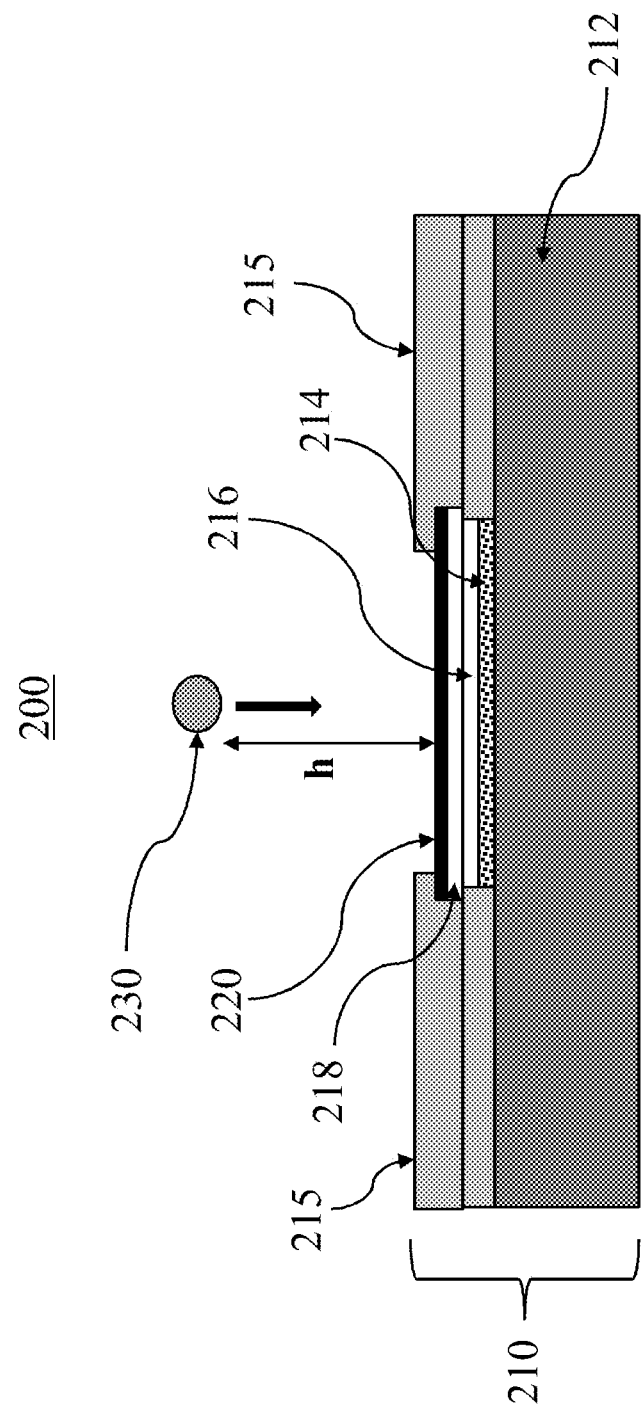
FIG. 15b is a schematic cross-sectional view of an embodiment of the apparatus that is used to perform the inverted ball on sandpaper (IBoS) test described in the present disclosure.
Figure 15C:
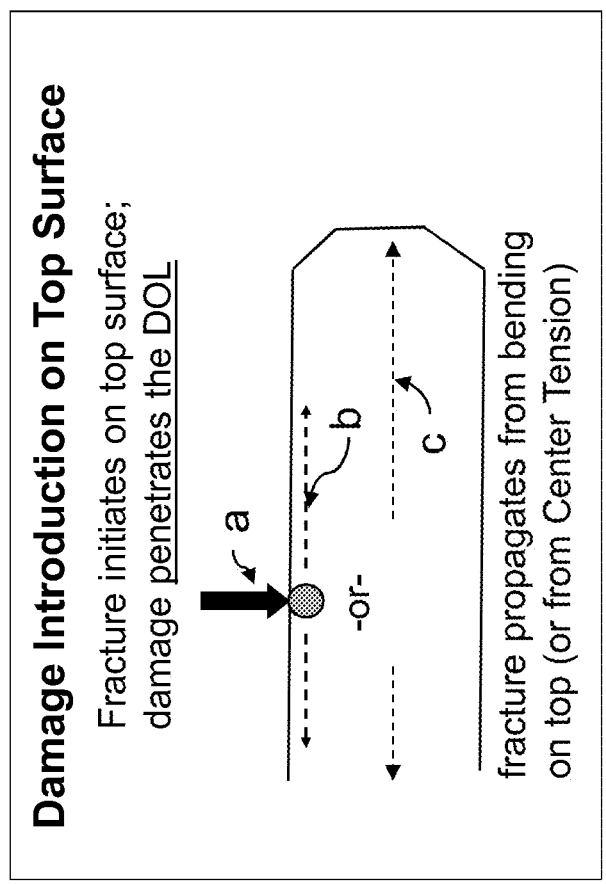
FIG. 15c is a schematic cross-sectional representation of the dominant mechanism for failure due to damage introduction plus bending that typically occurs in strengthened glass articles that are used in mobile or hand held electronic devices.

An inverted ball on sandpaper (IBoS) test is a dynamic component level test that mimics the dominant mechanism for failure due to damage introduction plus bending that typically occurs in strengthened glass articles that are used in mobile or hand held electronic devices, as schematically shown in FIG. 15c. In the field, damage introduction (a in FIG. 15c) occurs on the top surface of the glass. Fracture initiates on the top surface of the glass and damage either penetrates the compressive layer (b in FIG. 15c) or the fracture propagates from bending on the top surface or from center tension (c in FIG. 15c). The IBoS test is designed to simultaneously introduce damage to the surface of the glass and apply bending under dynamic load.

An IBoS test apparatus is schematically shown in FIG. 15b. Apparatus 200 includes a test stand 210 and a ball 230. Ball 230 is a rigid or solid ball such as, for example, a stainless steel ball, or the like. In one embodiment, ball 230 is a 4.2 gram stainless steel ball having diameter of 10 mm. The ball 230 is dropped directly onto the glass sample 218 from a predetermined height h. Test stand 210 includes a solid base 212 comprising a hard, rigid material such as granite or the like. A sheet 214 having an abrasive material disposed on a surface is placed on the upper surface of the solid base 212 such that surface with the abrasive material faces upward. In some embodiments, sheet 214 is sandpaper having a 30 grit surface and, in other embodiments, a 180 grit surface. Glass sample 218 is held in place above sheet 214 by sample holder 215 such that an air gap 216 exists between glass sample 218 and sheet 214. The air gap 216 between sheet 214 and glass sample 218 allows the glass sample 218 to bend upon impact by ball 230 and onto the abrasive surface of sheet 214. In one embodiment, the glass sample 218 is clamped across all corners to keep bending contained only to the point of ball impact and to ensure repeatability. In some embodiments, sample holder 214 and test stand 210 are adapted to accommodate sample thicknesses of up to about 2 mm. The air gap 216 is in a range from about 50 µm to about 100 µm. An adhesive tape 220 may be used to cover the upper surface of the glass sample to collect fragments in the event of fracture of the glass sample 218 upon impact of ball 230.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

Figure 15D:
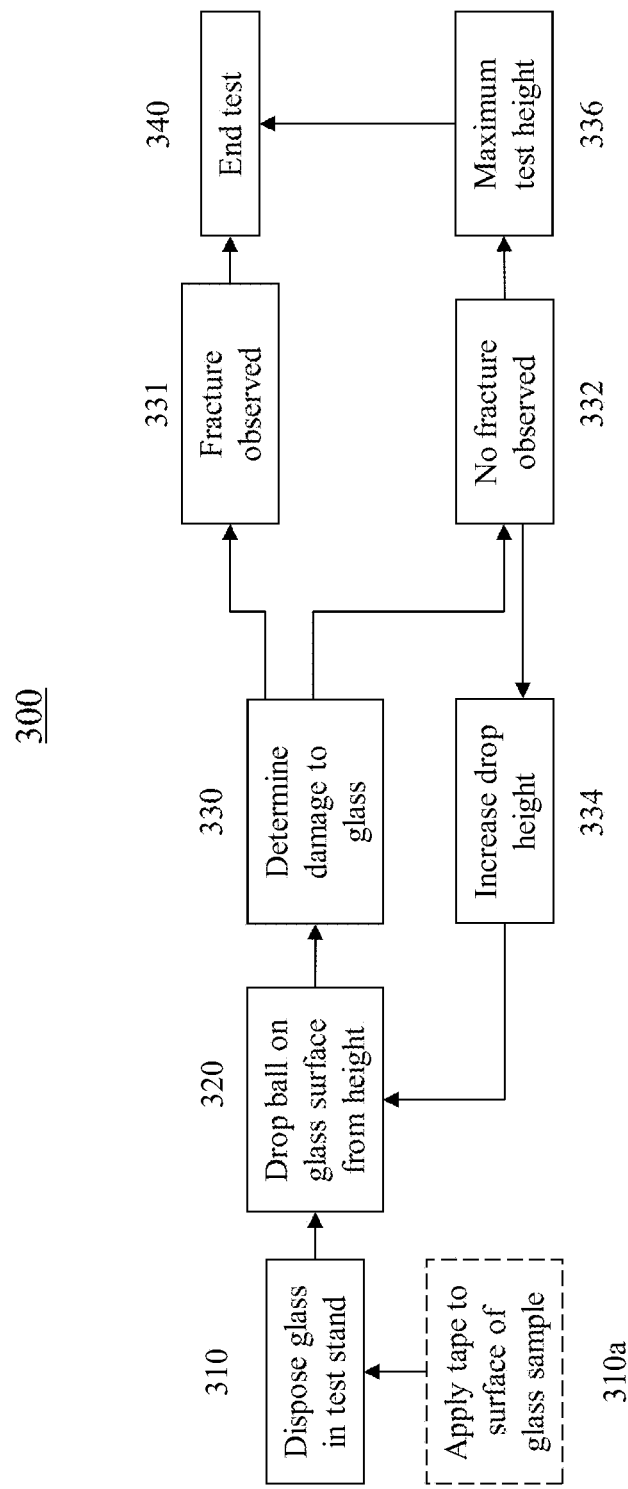
FIG. 15d is a flow chart for a method of conducting the IBoS test in the apparatus described herein.

In one aspect, a method 300 of conducting the IBoS test using the apparatus 200 described hereinabove is shown in FIG. 15d. In Step 310, a glass sample (218 in FIG. 15b) is placed in the test stand 210, described previously and secured in sample holder 215 such that an air gap 216 is formed between the glass sample 218 and sheet 214 with an abrasive surface. Method 300 presumes that the sheet 214 with an abrasive surface has already been placed in test stand 210. In some embodiments, however, the method may include placing sheet 214 in test stand 210 such that the surface with abrasive material faces upward. In some embodiments (Step 310a), an adhesive tape 220 is applied to the upper surface of the glass sample 218 prior to securing the glass sample 218 in the sample holder 210.

In Step 320, a solid ball 230 of predetermined mass and size is dropped from a predetermined height h onto the upper surface of the glass sample 218, such that the ball 230 impacts the upper surface (or adhesive tape 220 affixed to the upper surface) at approximately the center (i.e., within 1 mm, or within 3 mm, or within 5 mm, or within 10 mm of the center) of the upper surface. Following impact in Step 320, the extent of damage to the glass sample 218 is determined (Step 330). As previously described hereinabove, herein, the term "fracture" means that a crack propagates across the entire thickness and/or entire surface of a substrate when the substrate is dropped or impacted by an object.

In method 300, the sheet 218 with the abrasive surface may be replaced after each drop to avoid "aging" effects that have been observed in repeated use of other types (e.g., concrete or asphalt) of drop test surfaces.

Various predetermined drop heights h and increments are typically used in method 300. The test may, for example, utilize a minimum drop height to start (e.g., about 10-20 cm). The height may then be increased for successive drops by either a set increment or variable increments. The test described in method 300 is stopped once the glass sample 218 breaks or fractures (Step 331). Alternatively, if the drop height h reaches the maximum drop height (e.g., about 100 cm) without glass fracture, the drop test of method 300 may also be stopped, or Step 320 may be repeated at the maximum height until fracture occurs.

In some embodiments, IBoS test of method 300 is performed only once on each glass sample 218 at each predetermined height h. In other embodiments, however, each sample may be subjected to multiple tests at each height.

If fracture of the glass sample 218 has occurred (Step 331 in FIG. 15d), the IBoS test according to method 300 is ended (Step 340). If no fracture resulting from the ball drop at the predetermined drop height is observed (Step 332), the drop height is increased by a predetermined increment (Step 334)—such as, for example 5, 10, or 20 cm—and Steps 320 and 330 are repeated until either sample fracture is observed (331) or the maximum test height is reached (336) without sample fracture. When either Step 331 or 336 is reached, the test according to method 300 is ended.

When subjected to the inverted ball on sandpaper (IBoS) test described above, the strengthened glasses that have undergone the dual ion exchange process described hereinabove have at least about a 60% survival rate when the ball is dropped onto the surface of the glass from a height of 80 cm. For example, a strengthened glass article is described as having a 60% survival rate when dropped from a given height when three of five identical (or nearly identical) samples (i.e., having approximately the same composition and, when strengthened, approximately the same CS and DOC or DOL) survive the IBoS drop test without fracture when dropped from the prescribed height (here 80 cm). In other embodiments, the survival rate in the 80 cm IBoS test of the strengthened glasses that have undergone the dual ion exchange process is at least about 70%, in other embodiments, at least about 80%, and, in still other embodiments, at least about 90%. In other embodiments, the survival rate of the strengthened glasses dropped from a height of 100 cm in the IBoS test is at least about 60%, in other embodiments, at least about 70%, in still other embodiments, at least about 80%, and, in other embodiments, at least about 90%.

To determine the survivability rate of the strengthened glass article when dropped from a predetermined height using the IBoS test method and apparatus described hereinabove, at least five identical (or nearly identical) samples (i.e., having approximately the same composition and approximately the same CS and DOC or DOL) of the strengthened glass are tested, although larger numbers (e.g., 10, 20, 30, etc.) of samples may be subjected to testing to raise the confidence level of the test results. Each sample is dropped a single time from the predetermined height (e.g., 80 cm) or, alternatively, dropped from progressively higher heights without fracture until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

The strengthened glass articles described herein also demonstrate improved surface strength when subjected to abraded ring-on-ring (AROR) testing. The strength of a material is defined as the stress at which fracture occurs. The abraded ring-on-ring test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the ring-on-ring abraded ROR test methodology described herein. The contents of ASTM C1499-09 are incorporated herein by reference in their entirety. In one embodiment, the glass specimen is abraded prior to ring-on-ring testing with 90 grit silicon carbide (SiC) particles that are delivered to the glass sample using the method and apparatus described in Annex A2, entitled "abrasion Procedures," of ASTM C158-02 (2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass sample is abraded as described in ASTM C158-02, Annex 2, to normalize and/or control the surface defect condition of the sample using the apparatus shown in Figure A2.1 of ASTM C158-02. The abrasive material is sandblasted onto the sample surface at a load of 15 psi using an air pressure of 304 kPa (44 psi). After air flow is established, 5 cm$^3$ of abrasive material is dumped into a funnel and the sample is sandblasted for 5 seconds after introduction of the abrasive material.

Figure 19:
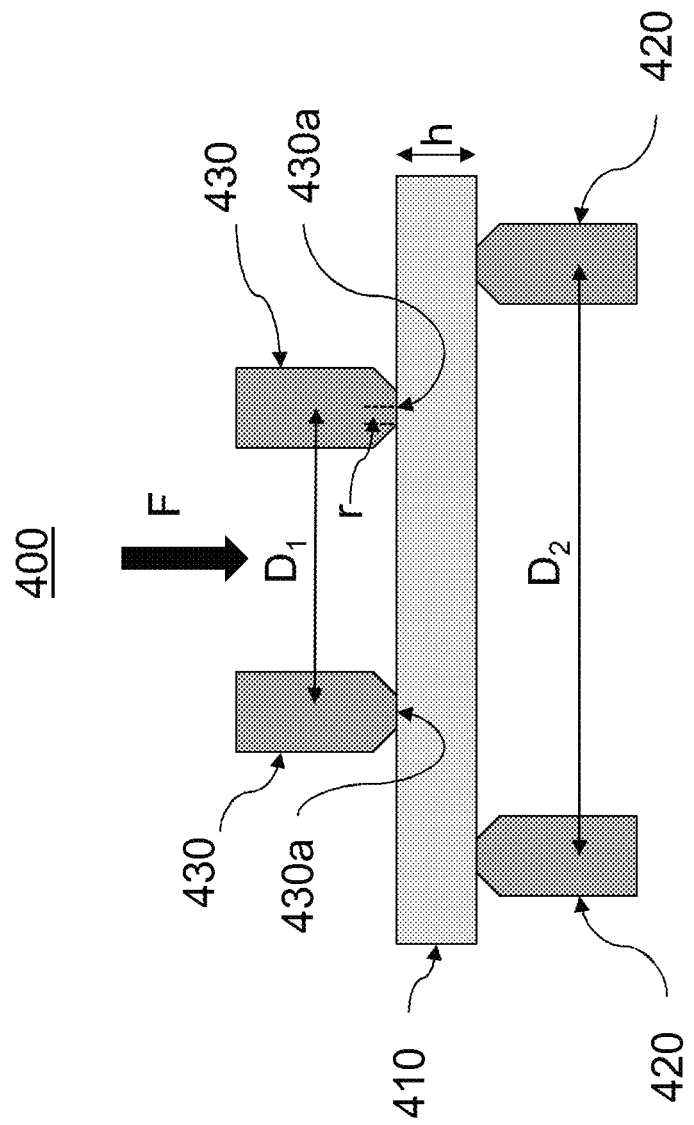
FIG. 19 is a schematic cross-sectional view of a ring-on-ring apparatus.

For the ring-on-ring test, a glass specimen having at least one abraded surface is placed between two concentric rings of differing size to determine equibiaxial flexural strength (i.e., the maximum stress that a material is capable of sustaining when subjected to flexure between two concentric rings), as schematically shown in FIG. 19. In the abraded ring-on-ring configuration 400, the abraded glass specimen 410 is supported by a support ring 420 having a diameter D2. A force F is applied by a load cell (not shown) to the surface of the glass specimen by a loading ring 430 having a diameter D1.

The ratio of diameters of the loading ring and support ring $D_1/D_2$ may be in a range from about 0.2 to about 0.5. In some embodiments, $D_1/D_2$ is about 0.5. Loading and support rings 430, 420 should be aligned concentrically to within 0.5% of support ring diameter $D_2$. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, $h/2 \leq r \leq 3 h/2$, where h is the thickness of specimen 410. Loading and support rings 430, 420 are typically made of hardened steel with hardness $HR_c > 40$. ROR fixtures are commercially available.

The intended failure mechanism for the ROR test is to observe fracture of the specimen 410 originating from the surface 430a within the loading ring 430. Failures that occur outside of this region—i.e., between the loading rings 430 and support rings 420—are omitted from data analysis. Due to the thinness and high strength of the glass specimen 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass depends on the presence of surface flaws. However, the likelihood of a flaw of a given size being present cannot be precisely predicted, as the strength of glass is statistical in nature. A Weibull probability distribution is therefore generally used as a statistical representation of the data obtained.

Figure 20:
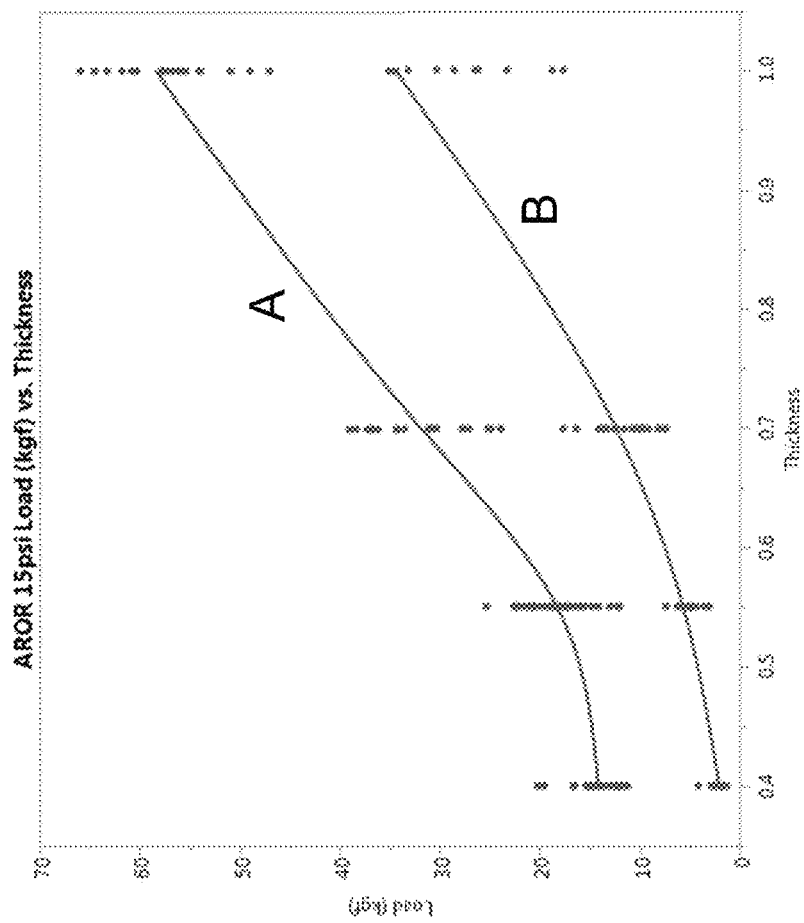
FIG. 20 is a plot of abraded ring-on-ring data as a function of sample thickness for two strengthened alkali aluminosilicate glasses.

In some embodiments, the strengthened glass described herein has a surface or equibiaxial flexural strength of at least 10 kgf and up to about 50 kgf as determined by abraded ring-on-ring testing. In other embodiments, the surface strength is at least 20 kgf, and in still other embodiments, at least 30 kgf. A plot of AROR data as a function of sample thickness for two strengthened alkali aluminosilicate glasses is shown in FIG. 20. Strengthened glass A, which is described in U.S. patent application Ser. No. 13/305,271, and having a nominal composition of about 57 mol % $SiO_2$, 0 mol % $B_2O_3$, about 17 mol % $Al_2O_3$, about 7% $P_2O_5$, about 17 mol % $Na_2O$, about 0.02 mol % $K_2O$, and about 3 mol % MgO, exhibits a compressive stress profile corresponding to that shown in FIG. 3 resulting from the two-step ion exchange process described herein. Strengthened glass B, which is described in U.S. patent application Ser. No. 13/903,433, and having a nominal composition of about 68 mol % $SiO_2$, about 13 mol % $Al_2O_3$, about 4 mol % $B_2O_3$, about 14 mol % $Na_2O$, about 0.01 mol % $K_2O$, and about 2 mol % MgO, does not exhibit a compressive stress profile corresponding to that shown in FIG. 3. As can be seen in FIG. 20, the two step ion exchange process results in higher surface strength as determined by AROR measurements.

EXAMPLES

The following examples illustrate the features and advantages described herein and are no way intended to limit the disclosure and appended claims hereto.

Compressive Stress Profiles

Using the methods described by Roussev I and Roussev II, referenced hereinabove, glass samples of various thicknesses were ion exchanged and their respective compressive stress profiles were determined. Spectra of bound optical modes for TM and TE polarization are collected via prism coupling techniques, and used in their entirety to obtain detailed and precise TM and TE refractive index profiles $n_{TM}(z)$ and $n_{TE}(z)$. Detailed index profiles are obtained by fitting the measured mode spectra to numerically calculated spectra of pre-defined functional forms that describe the shapes of the index profiles and obtaining the parameters of the functional forms from the best fit. The glass samples had compositions described in U.S. patent application Ser. No. 13/678,013 by Timothy M. Gross. Samples having thicknesses of 0.4 mm, 0.5 mm, 0.7 mm, 0.8 mm, and 1.0 mm were studied. The results of these ion exchange studies are summarized in Table 2.

TABLE 2

Results of ion exchange studies. $IOX_1$ and $IOX_2$ refer to the first and second ion exchange steps, respectively.

| Sample | a | b | c | d | e |
|---|---|---|---|---|---|
| Thickness (mm) | 0.4 | 0.4 | 0.4 | 0.5 | 0.5 |
| $IOX_1$ | | | | | |
| Time (hr) | 9 | 10 | 11.25 | 5.8 | 8.3 |
| T (° C.) | 441 | 441 | 441 | 440 | 440 |
| Wt % $NaNO_3/KNO_3$ | 52/48 | 52/48 | 52/48 | 37/63 | 52/48 |
| DOC (μm) | 63 | 65 | 67 | 61 | 66 |
| CS (MPa) | 232 | 232 | 227 | 329 | 243 |
| Slope A (MPa/μm) | | | −3.4 | | |
| $IOX_2$ | | | | | |
| Time (min) | | | 12 | | |
| T (° C.) | | | 390 | | |
| Wt % $NaNO_3/KNO_3$ | | | 1/99 | | |
| DOC (μm) | | | 61 | | |
| CS (MPa) | | | 846 | | |
| Slope A (MPa/μm) | | | −3.5 | | |
| Slope B (MPa/μm) | | | −85 | | |
| Transition region (μm) | | | 8-16 | | |

| Sample | k | f | g | h | l |
|---|---|---|---|---|---|
| Thickness (mm) | 0.55 | 0.7 | 0.8 | 0.8 | 0.8 |
| $IOX_1$ | | | | | |
| Time (hr) | 7.75 | 8.5 | 8.8 | 8.8 | 48 |
| Thickness (mm) | 0.55 | 0.7 | 0.8 | 0.8 | 0.8 |
| T (° C.) | 450 | 450 | 440 | 440 | 450 |
| Wt % $NaNO_3/KNO_3$ | 40/60 | 45/55 | 37/63 | 37/63 | 69/31 |
| DOC (μm) | 73 | 75 | 72 | 72 | 142 |
| CS (MPa) | 268 | 281 | 358 | 358 | 146 |
| Slope A (MPa/μm) | −3.7 | −3.75 | −5.1 | −5.1 | −1.03 |
| $IOX_2$ | | | | | |
| Time (min) | 12 | 12 | 12 | 24 | |
| T (° C.) | 390 | 390 | 390 | 390 | |
| Wt % $NaNO_3/KNO_3$ | 0.5/99.5 | 1/99 | 1/99 | 1/99 | |
| DOC (μm) | 70 | 72 | 70 | 70 | |
| CS (MPa) | 896 | 842 | 861 | 877 | |
| Slope A (MPa/μm) | −3.7 | −3.75 | −4.65 | −5 | |
| Slope B (MPa/μm) | −86 | −85 | −78 | −52 | |
| Transition region C (μm) | 8-16 | 7-15 | 7-12 | 8-15 | |

| Sample | m | i | j |
|---|---|---|---|
| Thickness (mm) | 0.8 | 0.9 | 1.0 |
| $IOX_1$ | | | |
| Time (hr) | 65 | 7.5 | 11 |
| T (° C.) | 450 | 450 | 440 |
| Wt % $NaNO_3/KNO_3$ | 69/31 | 38/62 | 37/63 |
| DOC (μm) | 153 | | 82 |
| CS (MPa) | 140 | | 359 |
| Slope A (MPa/μm) | −0.92 | | −5.3 |
| $IOX_2$ | | | |
| Time (min) | | 18 | 12 |
| T (° C.) | | 390 | 390 |
| Wt % $NaNO_3/KNO_3$ | | 2/98 | 1/99 |

TABLE 2-continued

Results of ion exchange studies. $IOX_1$ and $IOX_2$ refer to the first and second ion exchange steps, respectively.

| | | | |
|---|---|---|---|
| DOC (μm) | | 73 | 80 |
| CS (MPa) | | 746 | 860 |
| Slope A (MPa/μm) | | −4 | −5.3 |
| Slope B (MPa/μm) | | −52 | −73 |
| Thickness (mm) | 0.8 | 0.9 | 1.0 |
| Transition region C (μm) | | | 8-16 | i) 0.4 mm Thickness

Figure 4A:
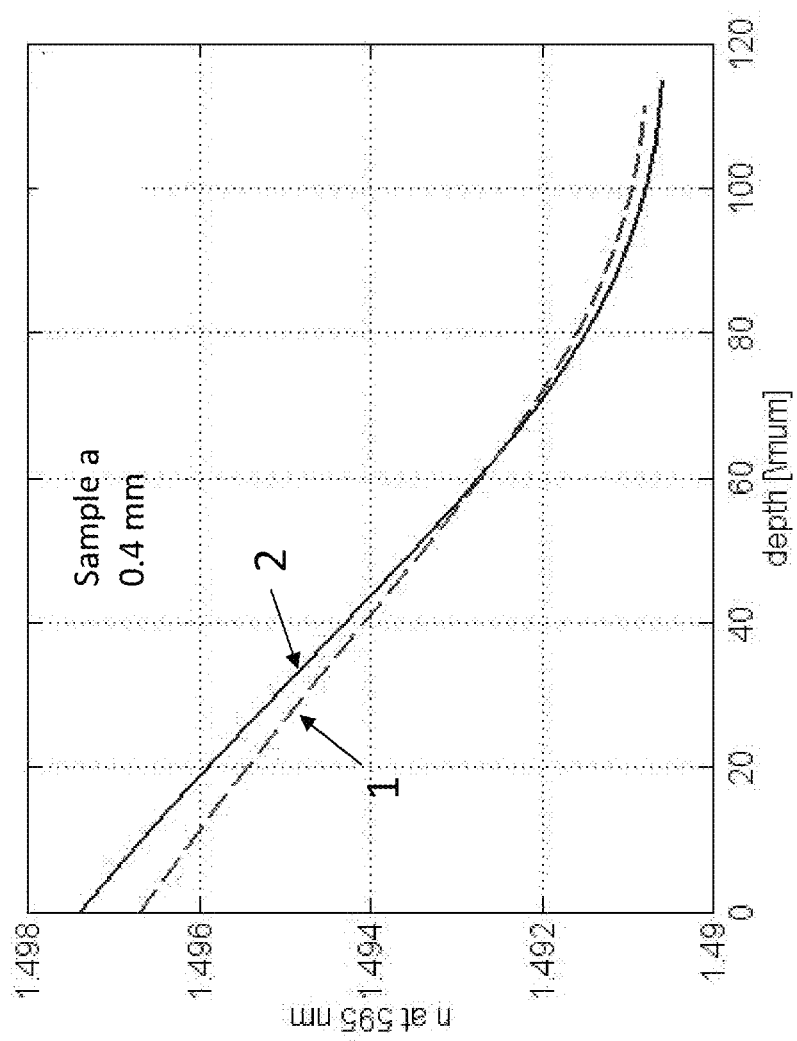
FIG. 4a is a plot of spectra of refractive index profiles for TM and TE polarization reconstructed form the respective TM and TE spectra of bound optical modes measured for ion exchanged glass sample a having a thickness of 0.4 mm.
Figure 4B:
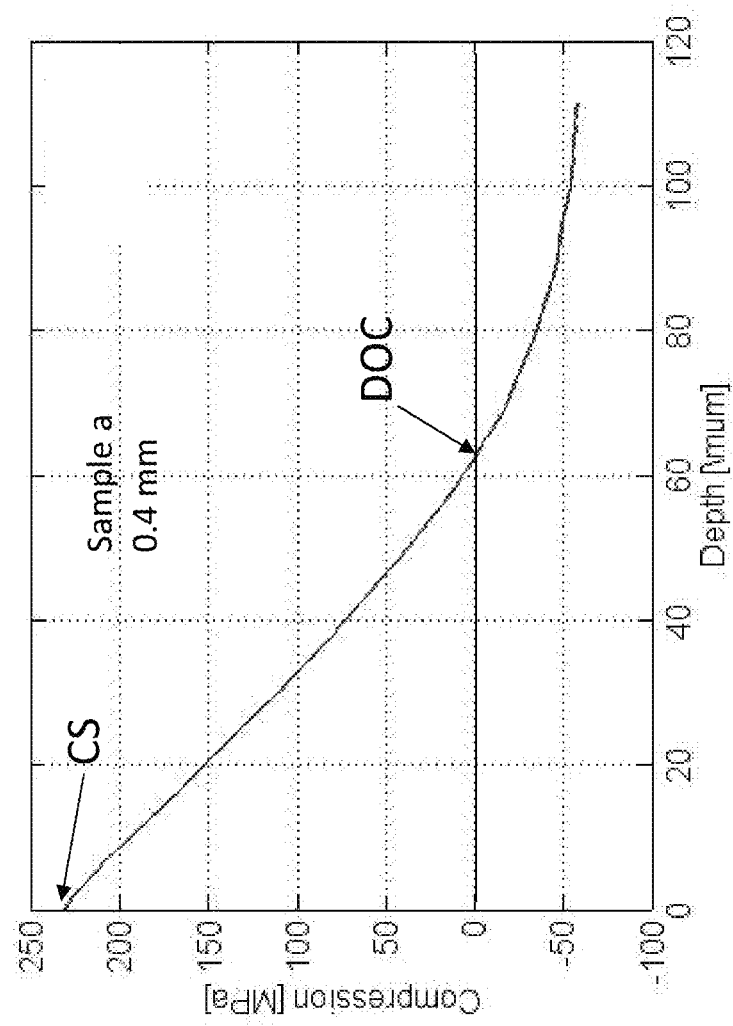

Sample a was ion exchanged at 440° C. for 9 hours in a molten salt bath containing 52% $NaNO_3$ and 48% $KNO_3$ by weight. Following ion exchange, the TE and TM mode spectra were measured and the compressive stress profile was determined therefrom. FIG. 4a shows TE (1) and TM (2) index profiles determined from the mode spectra, and FIG. 4b shows the compressive stress profile. The compressive stress profile has a single linear portion analogous to that shown in FIG. 2. The compressive stress CS at the surface and the depth of compression DOC of sample a were determined to be 232 MPa and 63 μm, respectively.

Figure 5A:
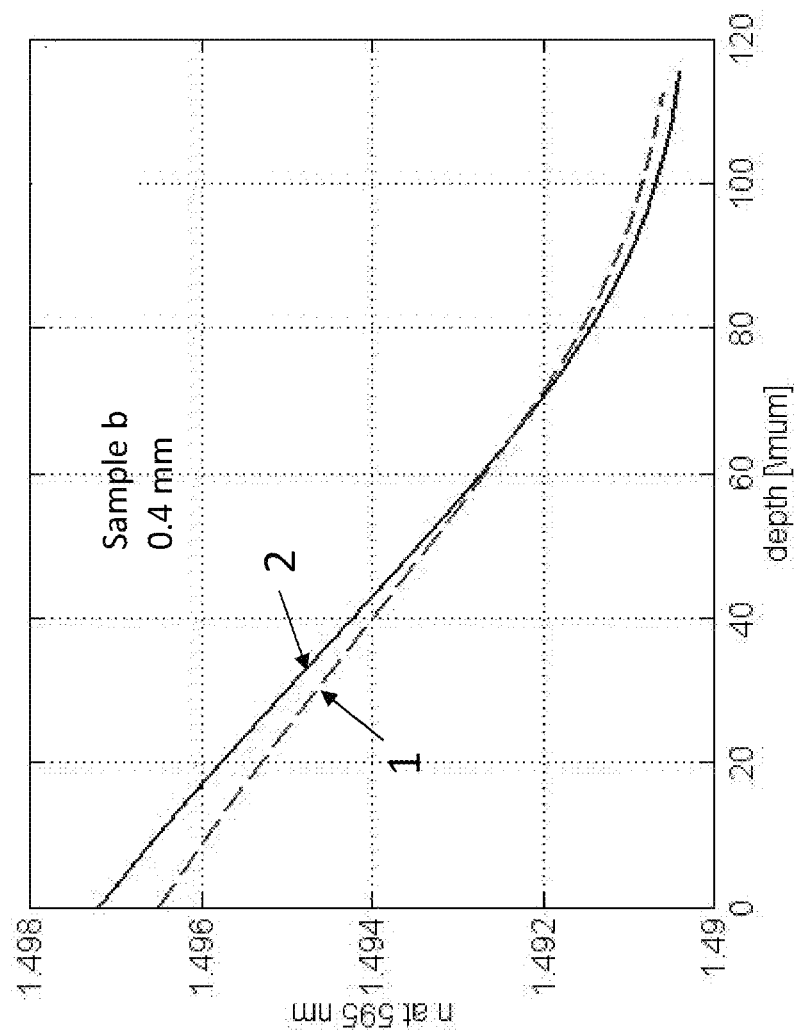
FIG. 5a is a plot of TM and TE refractive index profiles reconstructed from spectra of bound optical modes for TM and TE polarization measured for ion exchanged glass sample b having a thickness of 0.4 mm.
Figure 5B:
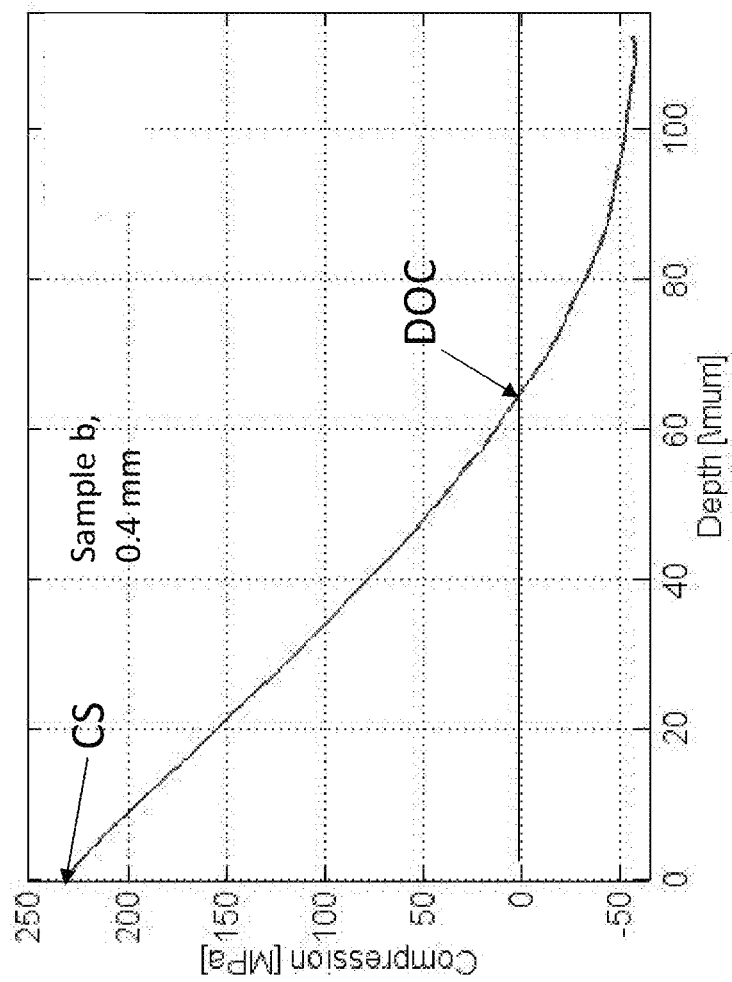

Sample b was ion exchanged at 440° C. for 10 hours in a molten salt bath containing 52% $NaNO_3$ and 48% $KNO_3$ by weight. Following ion exchange, the TE and TM mode spectra were measured and the compressive stress profile was determined therefrom. FIG. 5a shows TE (1) and TM (2) index profiles determined from the mode spectra, and FIG. 5b shows the compressive stress profile determined from the mode spectra. The compressive stress profile has a single linear portion analogous to that shown in FIG. 2. The compressive stress CS at the surface and the depth of compression of sample b were determined to be 232 MPa and 65 μm, respectively.

Figure 5C:
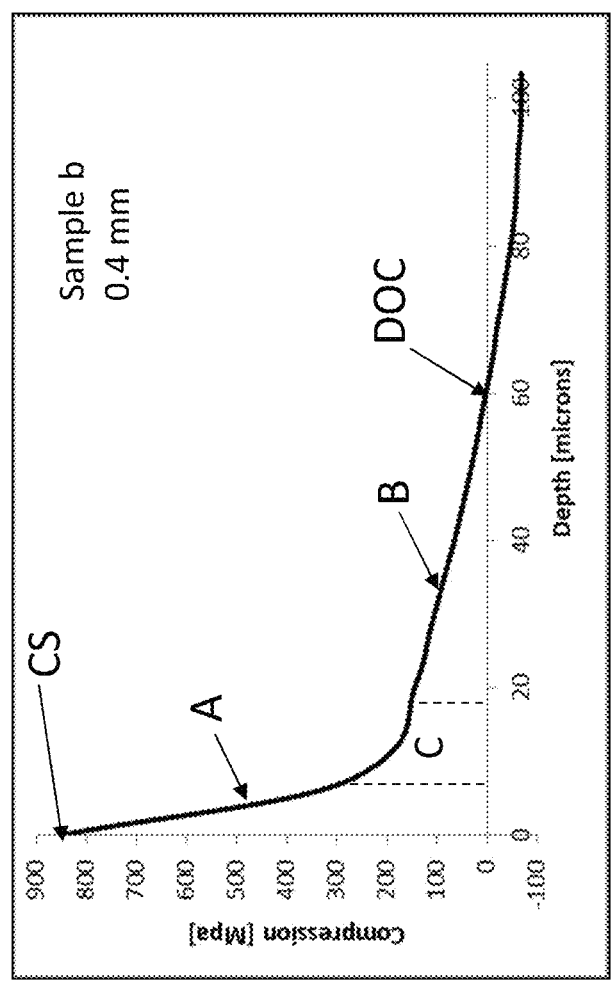
FIG. 5c is a plot of the compressive stress profile of the sample in FIGS. 5a and 5b following a second ion exchange step.

Sample b was then subjected to a second ion exchange at 390° C. for 12 minutes in a molten salt bath containing 1% $NaNO_3$ and 99% $KNO_3$ by weight. FIG. 5c shows the compressive stress profile determined from the mode spectra. The compressive stress profile has a first linear segment A extending from the surface of the glass (0 μm≤depth) to the beginning of a transition region C at about 8 μm and a second linear segment B extending from the end of the transition region C at about 16 μm. The compressive stress profile shown in FIG. 5c is analogous to the stress profile schematically shown in FIG. 3. The compressive stress CS at the surface of the sample and the depth of compression were determined to be 852 MPa and 61 μm, respectively. The slope of segment B of the stress profile is approximately −3.75 MPa/um, whereas the slope of segment A was −89 MPa/um. The transition region C from segment A to segment B ranged from a depth of about 9 μm to about 14 μm.

Figure 6A:
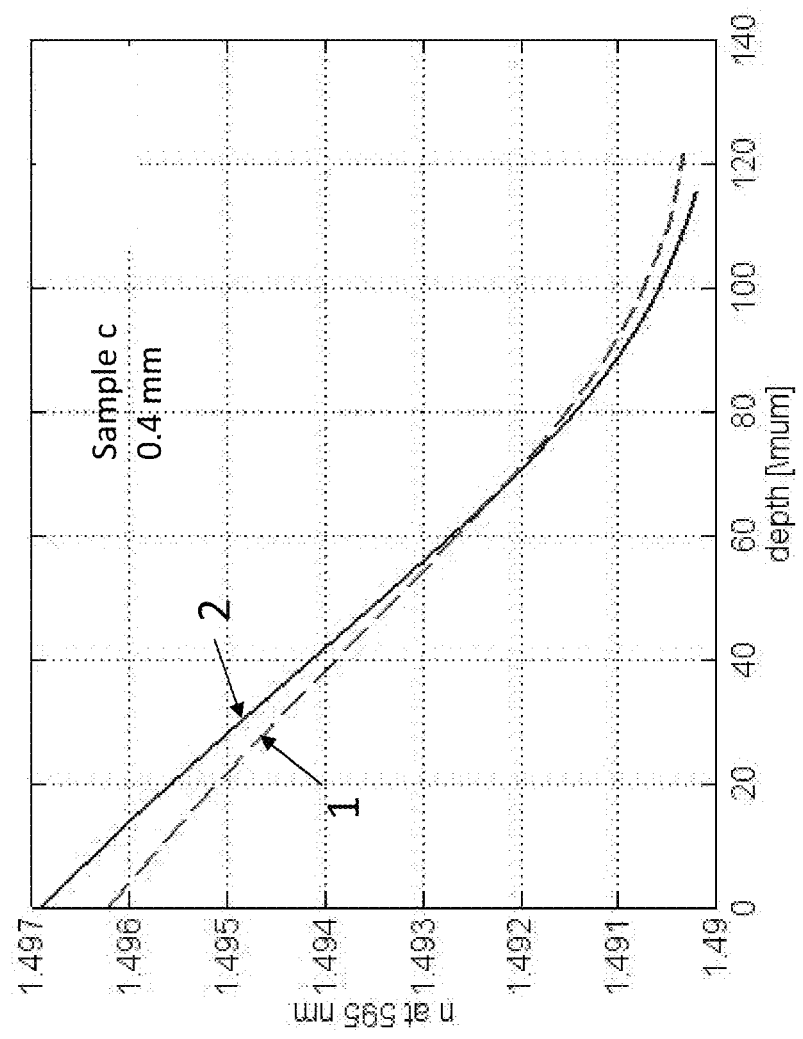
FIG. 6a is a plot of TM and TE refractive index profiles reconstructed from spectra of bound optical modes for TM and TE polarization measured for ion exchanged glass sample c having a thickness of 0.4 mm.
Figure 6B:
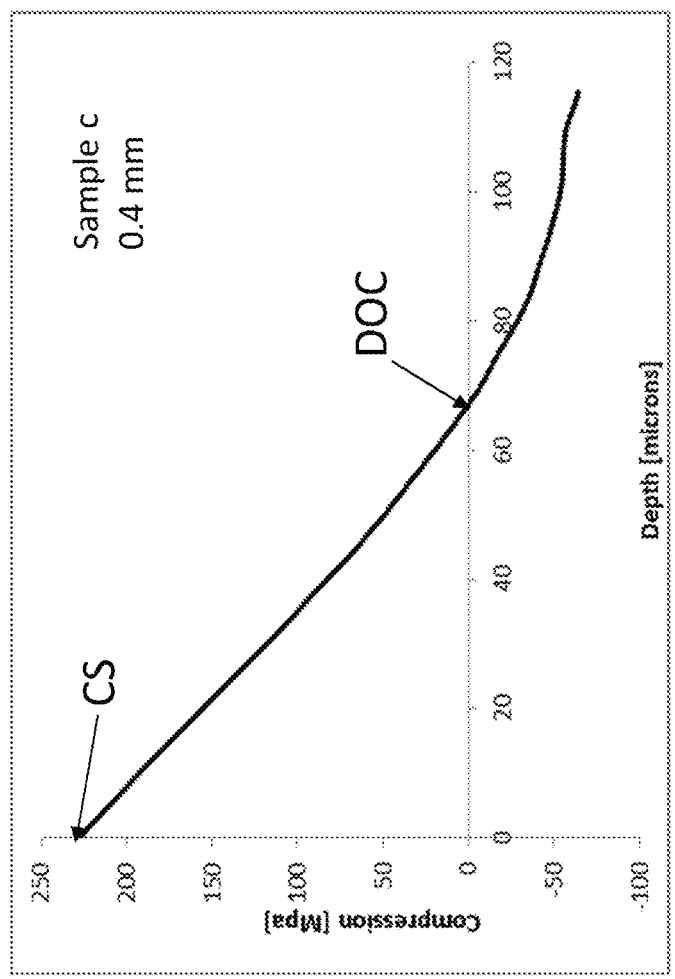

Sample c was ion exchanged at 440° C. for 11.25 hours in a molten salt bath containing 52% $NaNO_3$ and 48% $KNO_3$ by weight. Following ion exchange, the TE and TM index profiles determined from the mode spectra were measured and the compressive stress profile was determined therefrom. FIG. 6a shows TE (1) and TM (2) mode spectra, and FIG. 6b shows the compressive stress profile determined from the mode spectra. The compressive stress profile has a single linear portion analogous to that shown in FIG. 2. The compressive stress CS at the surface and the depth of compression of sample c were determined to be 227 MPa and 67 μm, respectively.

ii) 0.5 mm Thickness

Figure 7A:
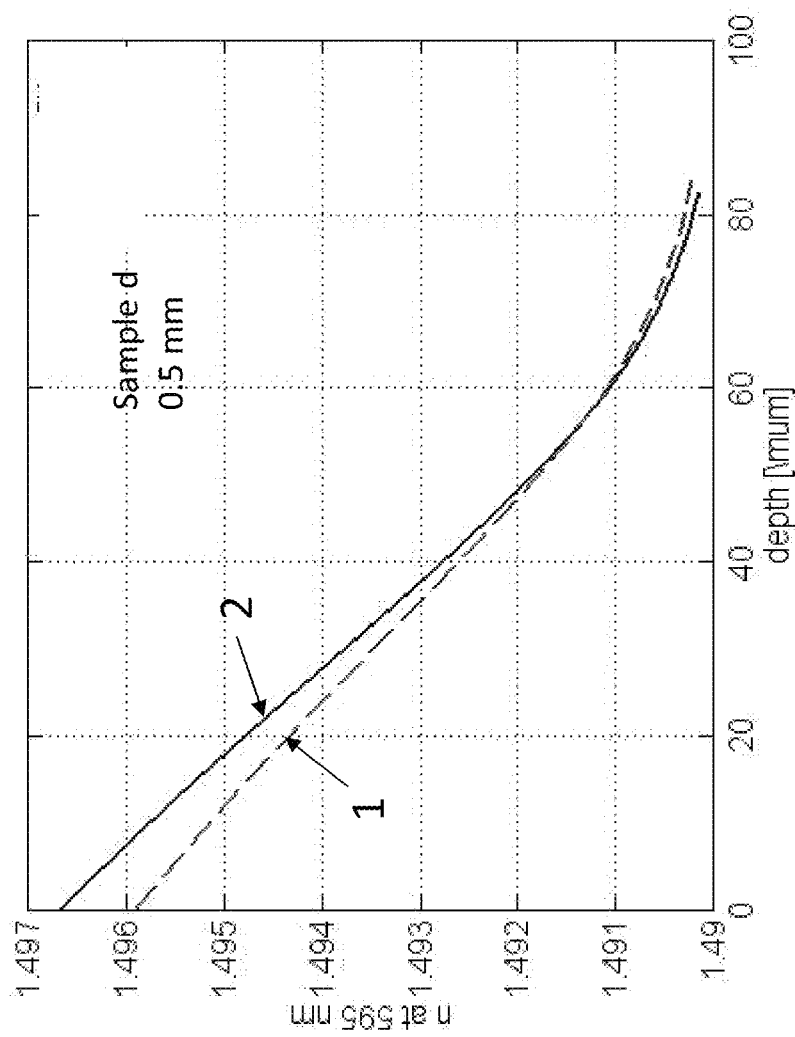
FIG. 7a is a plot of TM and TE refractive index profiles reconstructed from spectra of bound optical modes for TM and TE polarization measured for ion exchanged glass sample d having a thickness of 0.5 mm.
Figure 7B:
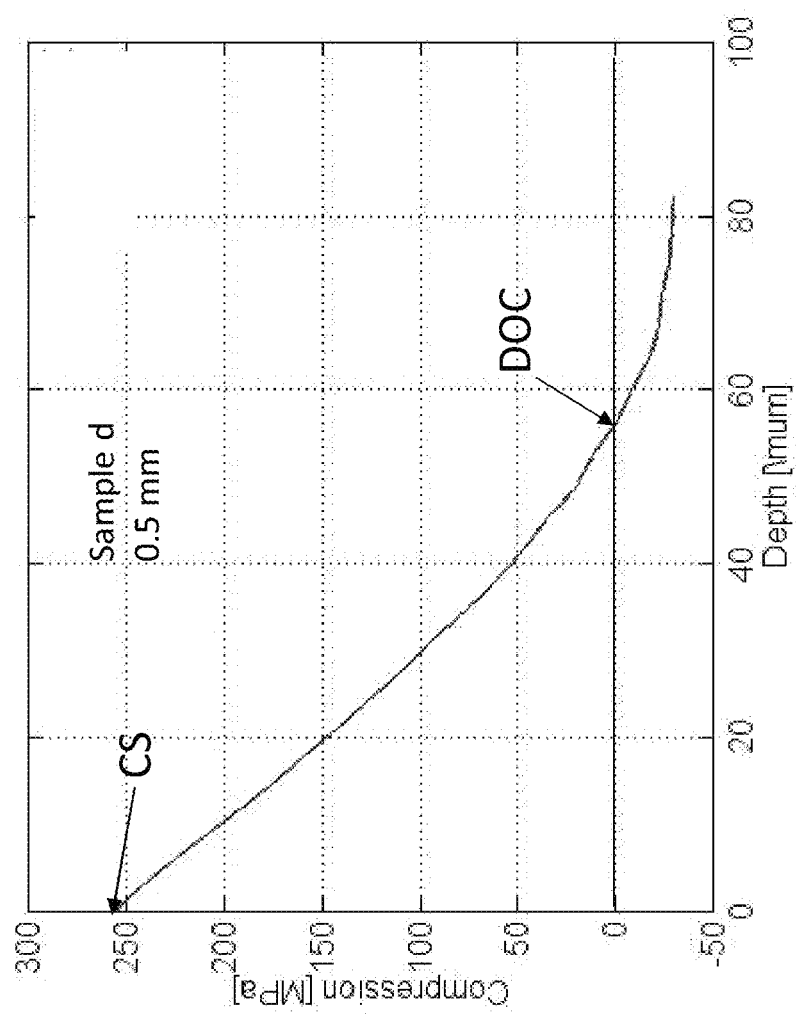

Sample d was ion exchanged at 440° C. for 5.8 hours in a molten salt bath containing 37% $NaNO_3$ and 63% $KNO_3$ by weight. Following ion exchange, the TE and TM index profiles determined from the mode spectra were measured and the compressive stress profile was determined therefrom. FIG. 7a shows TE (1) and TM (2) mode spectra, and FIG. 7b shows the compressive stress profile determined from the mode spectra. The compressive stress profile has a single linear portion analogous to that shown in FIG. 2. The compressive stress CS at the surface and the depth of compression of sample d were determined to be 255 MPa and 57 μm, respectively.

Figure 8A:
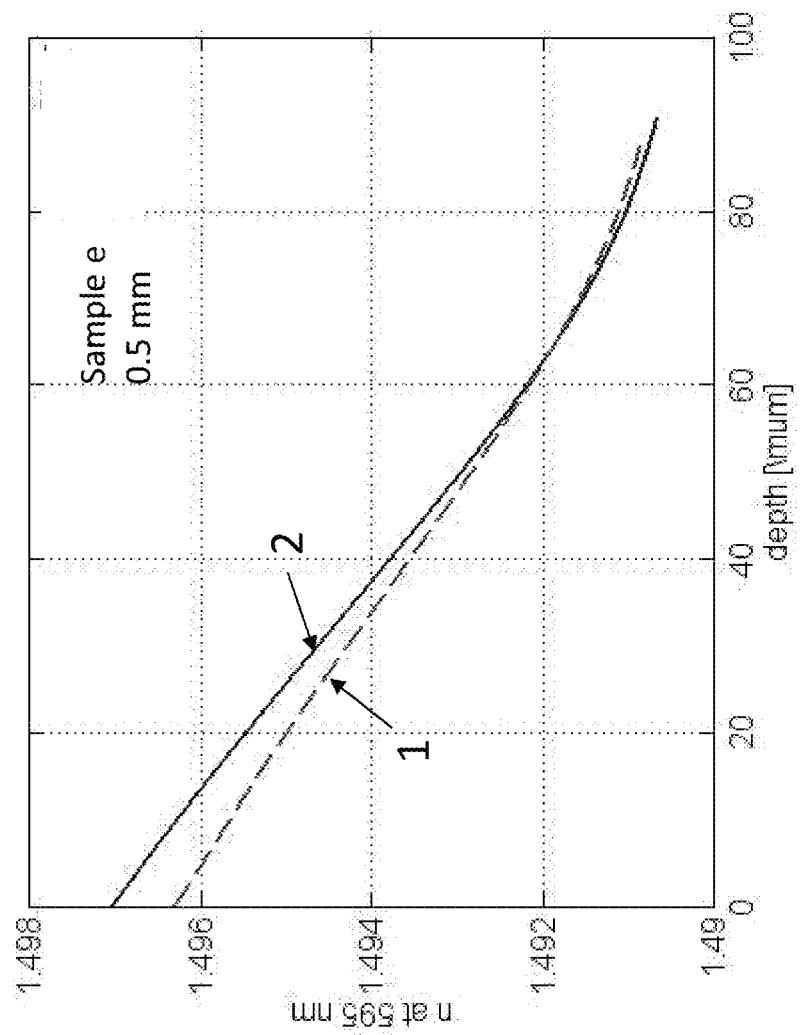
FIG. 8a is a plot of TM and TE refractive index profiles reconstructed from spectra of bound optical modes for TM and TE polarization measured for ion exchanged glass sample e having a thickness of 0.5 mm.
Figure 8B:
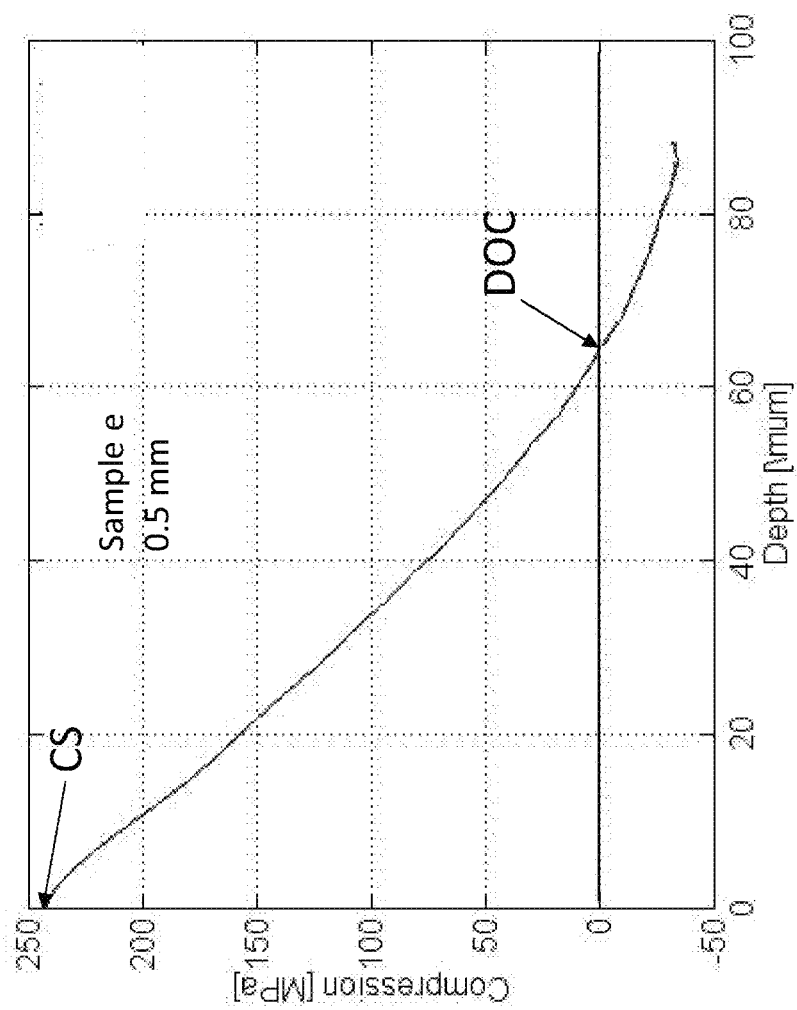

Sample e was ion exchanged at 440° C. for 8.3 hours in a molten salt bath containing 37% $NaNO_3$ and 63% $KNO_3$ by weight. Following ion exchange, the TE and TM index profiles determined from the mode spectra were measured and the compressive stress profile was determined therefrom. FIG. 8a shows the TE (1) and TM (2) mode spectra, and FIG. 8b shows the compressive stress profile determined from the index profiles derived from the mode spectra. The compressive stress profile has a single linear portion analogous to that shown in FIG. 2. The compressive stress CS at the surface and the depth of compression of sample e were determined to be 243 MPa and 66 μm, respectively.

iii) 0.55 mm Thickness

Sample k was first ion exchanged at 450° C. for 7.75 hours in a molten salt bath containing approximately 40% $NaNO_3$ and 60% $KNO_3$ by weight. Following ion exchange, the TE and TM mode spectra were measured and the compressive stress profile was determined therefrom. FIG. 13a shows the compressive stress profile determined from the index profiles derived from the mode spectra. The compressive stress profile has a single linear portion analogous to that shown in FIG. 2. The compressive stress CS at the surface and the depth of compression of sample k after the first ion exchange were determined to be 268 MPa and 73 μm, respectively. The slope of the linear compressive stress profile was −3.7 MPa/um.

Sample k was then subjected to a second ion exchange at 390° C. for 12 minutes in a molten salt bath containing about 0.5% $NaNO_3$ and 99.5% $KNO_3$ by weight. FIG. 13b shows the compressive stress profile determined from the mode spectra. Following the second ion exchange, the compressive stress profile had a first linear segment A extending from the surface of the glass to a transition region C at about 8 μm and a second linear segment B extending from the transition region C at about 16 μm to the depth of compression DOC. The compressive stress profile in FIG. 13b is analogous to the stress profile schematically shown in FIG. 3. The compressive stress CS at the surface and the depth of compression of sample k after the second ion exchange were determined to be 896 MPa and 70 μm, respectively. The slope of segment B remained at approximately −3.7 MPa/um, whereas the slope of portion A increased to about −86 MPa/um. The transition region C occurred over a range from a depth of about 8 μm to about 16 μm.

iv) 0.7 mm Thickness

Figure 9A:
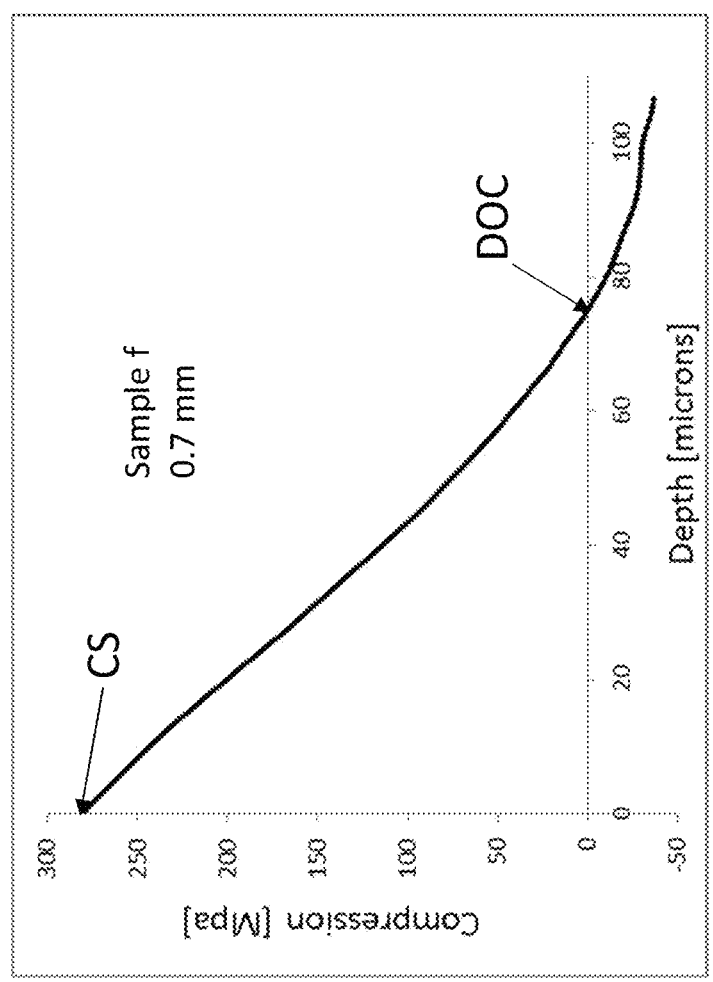
FIG. 9a is a plot of the compressive stress profile for ion exchanged glass sample f having a thickness of 0.7 mm.

Sample f was first ion exchanged at 450° C. for 8.5 hours in a molten salt bath containing 45% $NaNO_3$ and 55% $KNO_3$ by weight. Following ion exchange, the TE and TM mode spectra were measured and the compressive stress profile was determined therefrom. FIG. 9a shows the compressive stress profile determined from the mode spectra. The compressive stress profile has a single linear portion analogous to that shown in FIG. 2. The compressive stress CS at the surface and the depth of compression of sample f after the first ion exchange were determined to be 281 MPa and 75 µm, respectively. The slope of the linear compressive stress profile was −3.75 MPa/um.

Figure 9B:
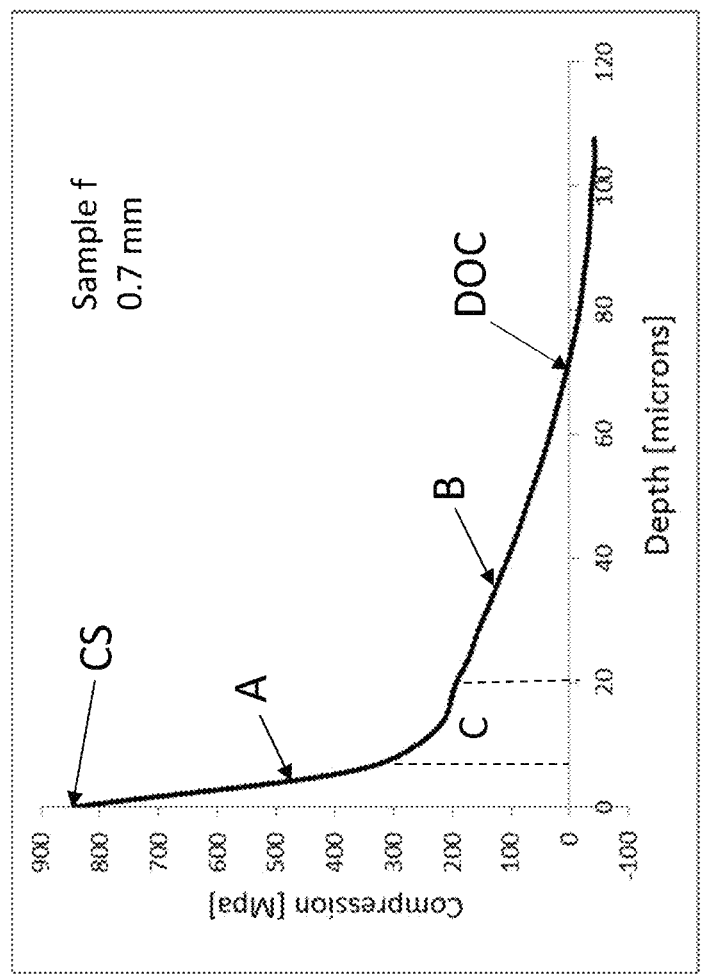
FIG. 9b is a plot of the compressive stress profile of the sample in FIG. 9a following a second ion exchange step.

Sample f was then subjected to a second ion exchange at 390° C. for 12 minutes in a molten salt bath containing 1% NaNO$_3$ and 99% KNO$_3$ by weight. FIG. 9b shows the compressive stress profile determined from the TE and TM mode spectra. Following the second ion exchange, the compressive stress profile had a first linear segment A extending from the surface of the glass to a transition region C at about 7 µm and a second linear segment B extending from the transition region C at about 15 µm to the depth of compression DOC. The CS profile is analogous to the stress profile schematically shown in FIG. 3. The compressive stress CS at the surface and the depth of compression of sample f after the second ion exchange were determined to be 842 MPa and 72 µm, respectively. The slope of segment A increased to −85 MPa/um whereas the slope of segment B remained at approximately −3.75 MPa/um. The transition region C ranged from a depth of about 7 µm to about 15 1.1M.

iv) 0.8 mm Thickness

Figure 10A:
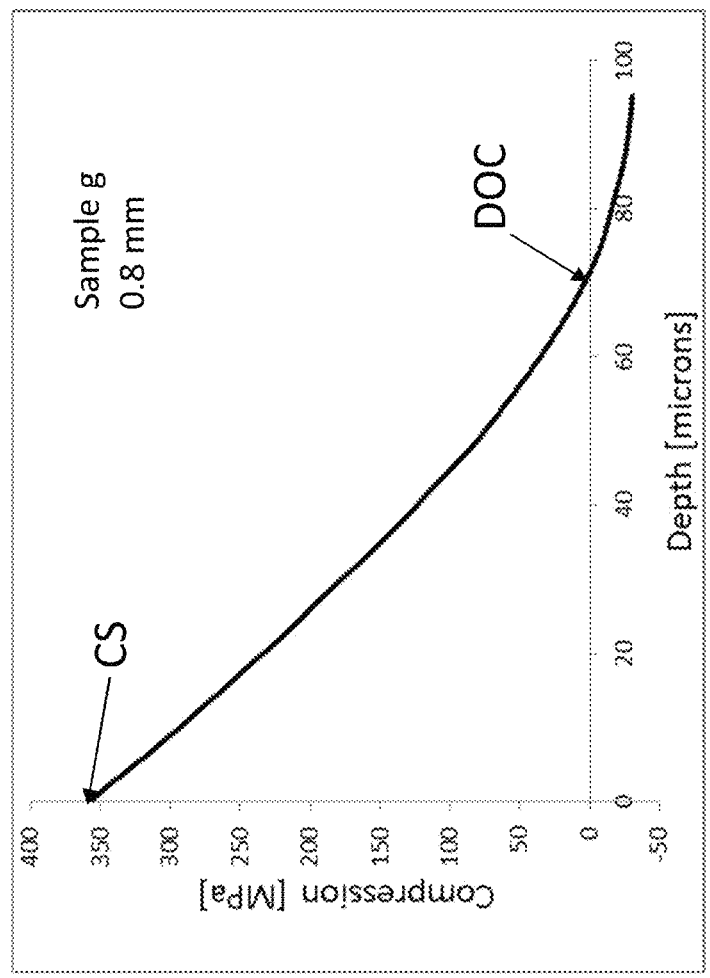
FIG. 10a is a plot of the compressive stress profile for ion exchanged glass sample g having a thickness of 0.8 mm.

Samples g and h were first ion exchanged at 440° C. for 8.8 hours in a molten salt bath containing 37% NaNO$_3$ and 63% KNO$_3$ by weight. Following ion exchange, the TE and TM mode spectra were measured and the compressive stress profile was determined therefrom. FIG. 10a shows the compressive stress profile of sample g determined from the mode spectra following the first ion exchange. The compressive stress profile has a single linear portion analogous to that shown in FIG. 2. The compressive stress CS at the surface and the depth of compression of sample g after the first ion exchange were determined to be 358 MPa and 72 µm, respectively. The slope of the linear compressive stress profile was −5.1 MPa/um.

Figure 10B:
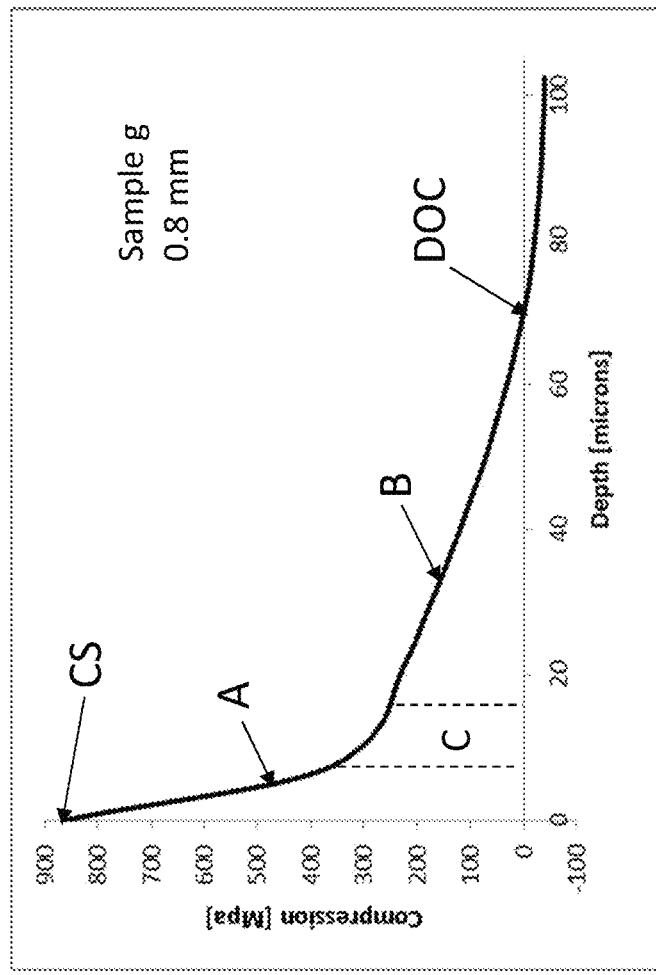
FIG. 10b is a plot of the compressive stress profile of the sample in FIG. 10a following a second ion exchange step.

Sample g was then subjected to a second ion exchange at 319° C. for 12 minutes in a molten salt bath containing 1% NaNO$_3$ and 99% KNO$_3$ by weight. FIG. 10b shows the compressive stress profile determined from the TE and TM mode spectra. Following the second ion exchange, the compressive stress profile had a first linear segment or portion A extending from the surface of the glass to a transition region and a second linear segment B extending from a transition region C to the depth of compression DOC. The compressive stress profile is analogous to the stress profile schematically shown in FIG. 3. The compressive stress CS at the surface and the depth of compression of sample g after the second ion exchange were determined to be 861 MPa and 70 µm, respectively. The slope of segment B was −4.65 MPa/um, whereas the slope of segment A was −78 MPa/um. The transition region C from segment A to segment B occurred over a range of depths from about 7 µm to about 12

Following the first ion exchange, sample h was subjected to a second ion exchange at 319° C. for 24 minutes in a molten salt bath containing 1% NaNO$_3$ and 99% KNO$_3$ by weight. Following the second ion exchange, the compressive stress profile had a first linear segment A extending from the surface of the glass to a depth of about 5 µm and a second linear segment B extending from the upper boundary of a transition region C at a depth of about 15 µm to a depth of 70 µm. The two segment CS profile is analogous to the stress profile schematically shown in FIG. 3. The compressive stress CS at the surface and the depth of compression of sample g after the second ion exchange were determined to be 877 MPa and 70 µm, respectively. The slope of segment B was about −5 MPa/um, whereas the slope of segment A was −52 MPa/um. The transition region C from segment A to segment B occurred over a range of depths from about 8 µm to about 15 µm.

Figure 16:
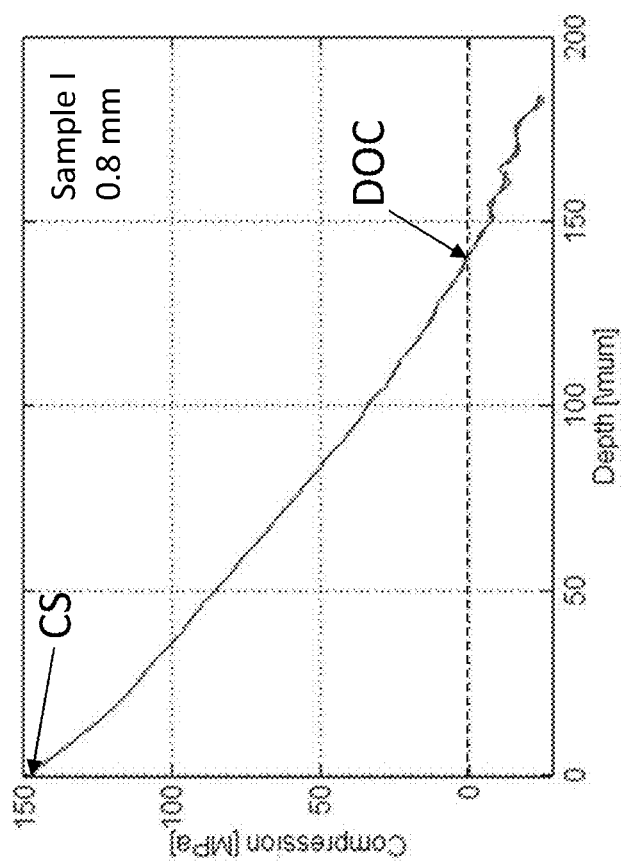
FIG. 16 is a graphical comparison of failure rates of strengthened glasses at varying DOL and CS values when subjected to the IBoS test described in the present disclosure.

Sample l was first ion exchanged at 450° C. for 48 hours in a molten salt bath containing 69% NaNO$_3$ and 31% KNO$_3$ by weight. Following ion exchange, the TE and TM mode spectra were measured and the compressive stress profile was determined therefrom. FIG. 16 shows the compressive stress profile determined from the TE and TM mode spectra. The compressive stress profile has a single linear portion analogous to that shown in FIG. 2. The compressive stress CS at the surface and the depth of compression of sample 1 after the first ion exchange were determined to be 146 MPa and 142 µm, respectively. The slope of the linear compressive stress profile was −1.03 MPa/um.

Figure 17:
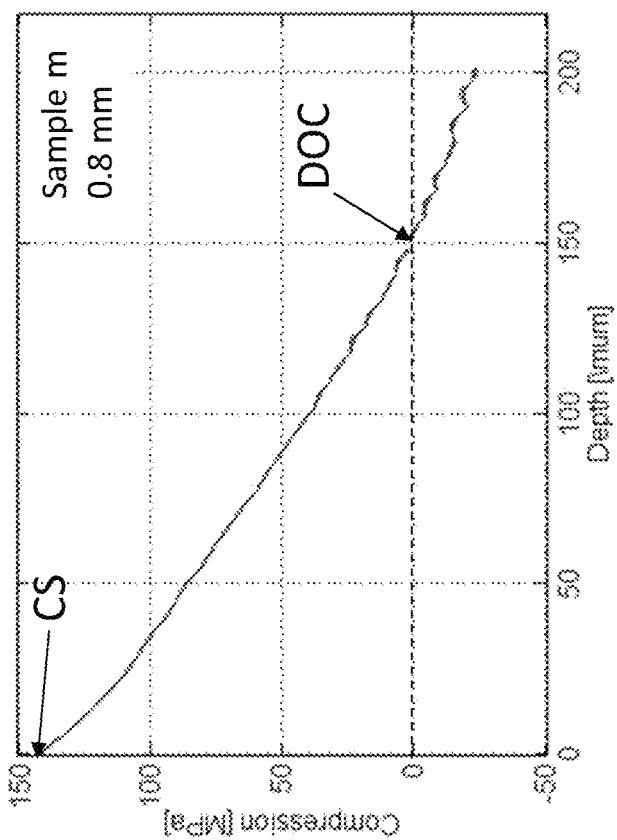
FIG. 17 is a plot of the compressive stress profile for ion exchanged glass sample m having a thickness of 0.8 mm.

Sample m was first ion exchanged at 450° C. for 65 hours in a molten salt bath containing 69% NaNO$_3$ and 31% KNO$_3$ by weight. Following ion exchange, the TE and TM mode spectra were measured and the compressive stress profile was determined therefrom. FIG. 17 shows the compressive stress profile determined from the mode spectra. The compressive stress profile has a single linear portion analogous to that shown in FIG. 2. The compressive stress CS at the surface and the depth of compression of sample m after the first ion exchange were determined to be 140 MPa and 153 µm, respectively. The slope of the linear compressive stress profile was −0.904 MPa/um.

0.9 mm Thickness

Sample i was first ion exchanged at approximately 450° C. for about 7.5 hours in a molten salt bath containing 38% NaNO$_3$ and 62% KNO$_3$ by weight. Following ion exchange, the TE and TM mode spectra were measured and the compressive stress profile was determined therefrom.

Figure 11:
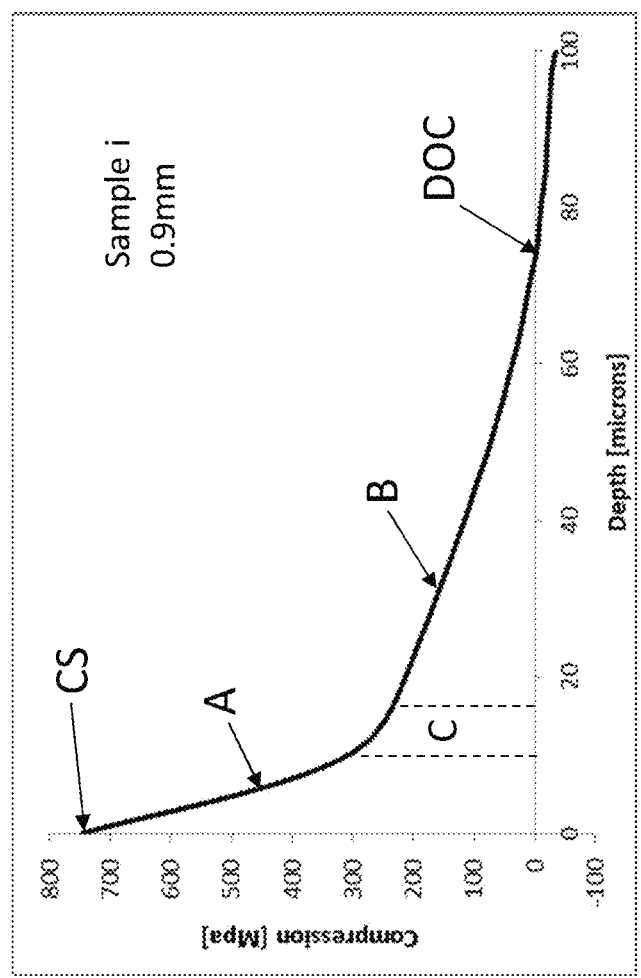
FIG. 11 is a plot of the compressive stress profile for ion exchanged glass sample i having a thickness of 0.9 mm following two ion exchange steps.

Sample i was then subjected to a second ion exchange at 390° C. for 18 minutes in a molten salt bath containing 2% NaNO$_3$ and 98% KNO$_3$ by weight. FIG. 11 shows the compressive stress profile determined from the TE and TM mode spectra. Following the second ion exchange, the compressive stress profile had a first linear segment A and a second linear segment B, which is analogous to the stress profile schematically shown in FIG. 3. The compressive stress CS at the surface and the depth of compression of sample h after the second ion exchange were determined to be 746 MPa and 73 µm, respectively. The slope of segment A was approximately −52 MPa/um, whereas the slope of segment B was about −4 MPa/um.

1.0 mm Thickness

Figure 12A:
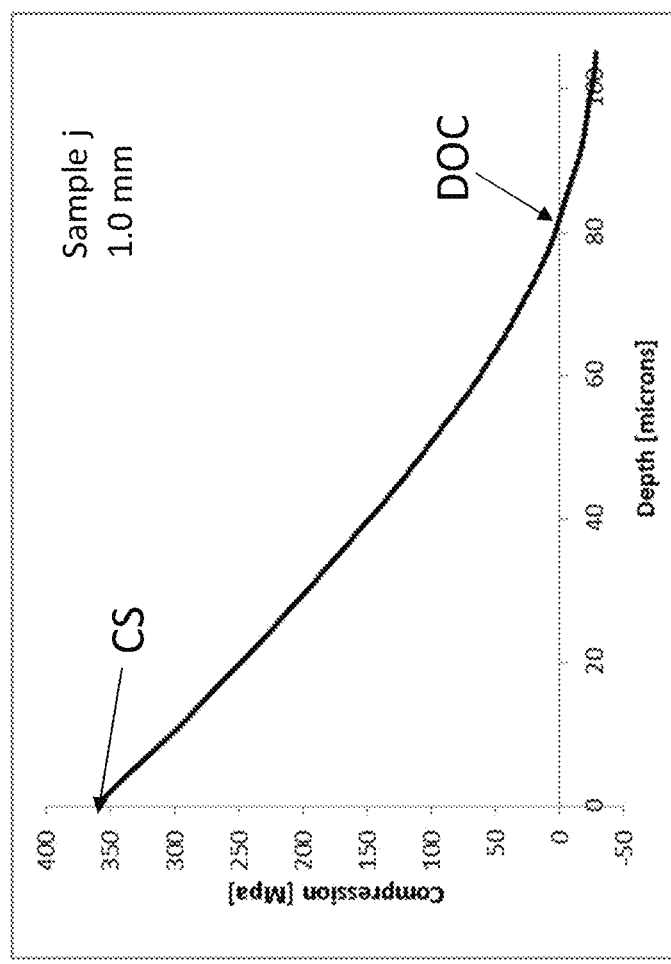
FIG. 12a is a plot of the compressive stress profile for ion exchanged glass sample j having a thickness of 1.0 mm.

Sample j was first ion exchanged at 440° C. for 11 hours in a molten salt bath containing 37% NaNO$_3$ and 63% KNO$_3$ by weight. Following ion exchange, the TE and TM mode spectra were measured and the compressive stress profile was determined therefrom. FIG. 12a shows the compressive stress profile of sample j determined from the mode spectra following the first ion exchange. The compressive stress profile has a single linear segment analogous to the stress profile shown in FIG. 2. The compressive stress CS at the surface and the depth of compression of sample j after the first ion exchange were determined to be 359 MPa and 82 µm, respectively. The slope of the linear compressive stress profile was −5.3 MPa/um.

Figure 12B:
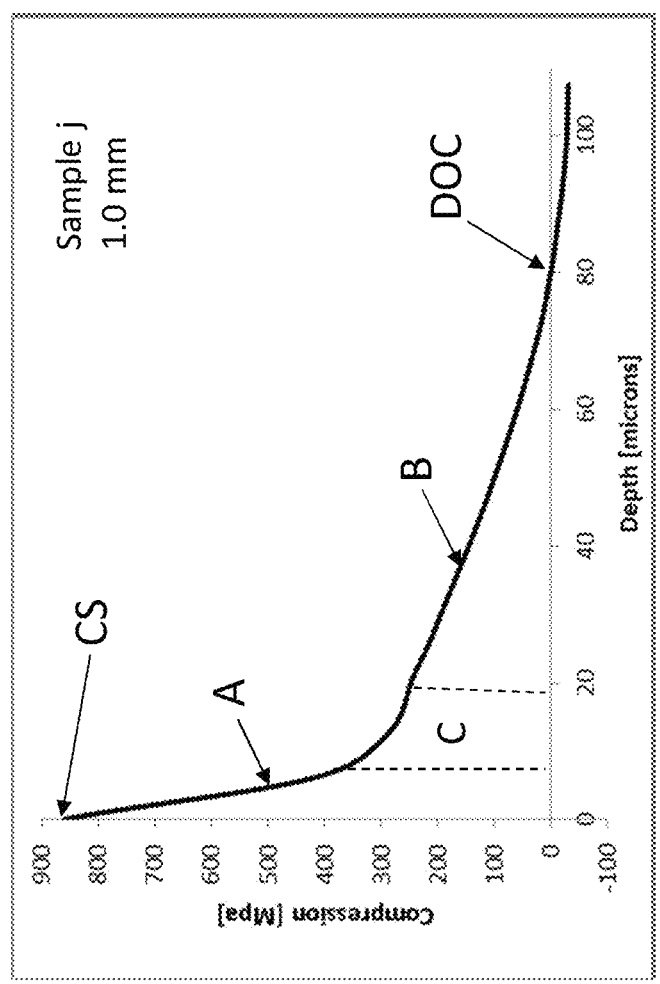
FIG. 12b is a plot of the compressive stress profile determined for the sample of FIG. 12a following a second ion exchange step.

Sample j was then subjected to a second ion exchange at 390° C. for 12 minutes in a molten salt bath containing 1% NaNO$_3$ and 99% KNO$_3$ by weight. FIG. 12b shows the compressive stress profile determined from the TE and TM mode spectra. Following the second ion exchange, the compressive stress profile had a first linear segment A extending from the surface of the glass to the beginning of a transition region C at about 8 μm and a second linear segment B extending from the end of transition region C at about 16 μm to the depth of compression DOC. This behavior is analogous to the stress profile schematically shown in FIG. 3. The compressive stress CS at the surface and the depth of compression of sample j after the second ion exchange were determined to be 860 MPa and 80 μm, respectively. The slope of segment A increased to −73 MPa/um following the second ion exchange, whereas the slope of segment B remained at approximately −5.3 MPa/um. The transition region C from slope A to slope B occurred over a range of depths from about 8 μm and about 16 μm.

Inverted Ball on Sandpaper (IBoS) Test

Three different types of glasses were subjected to inverted ball drop on sandpaper (IBoS) tests according to the procedure described herein. The tests were conducted using 30 grit sandpaper and a 4.2 g stainless steel ball having a diameter of 10 mm.

Sample sets A, D, and E are alkali aluminosilicate glasses of identical composition (nominal composition about 57 mol % $SiO_2$, 0 mol % $B_2O_3$, about 17 mol % $Al_2O_3$, about 7% $P_2O_5$, about 17 mol % $Na_2O$, about 0.02 mol % $K_2O$, and about 3 mol % MgO) and thickness (0.8 mm), described in U.S. patent application Ser. No. 13/305,271, cited above. Sample set A glasses were not ion exchanged. Sample set D glasses were ion exchanged using the single ion exchange method described herein and had a compressive depth of layer DOL of 47 μm and a surface compressive stress CS of 885 MPa, and sample set E glasses were ion exchanged using the dual ion exchange method described herein to produce a "spike" in compressive stress CS of 865 MPa at the surface of the glass and had a compressive depth of layer DOL of 97 μm.

Sample set C consists of commercially available alkali aluminosilicate glasses (Dragontrail® Glass, manufactured by Asahi Glass Company) of identical composition (nominal composition about 65 mol % $SiO_2$, about 8 mol % $Al_2O_3$, about 12 mol % $Na_2O$, about 4 mol % $K_2O$, about 0.3 mol % CaO, about 10 mol % MgO, and about 0.5 mol % $ZrO_2$) and thickness (0.8 mm). The glasses of sample set C was ion exchanged using the single ion exchange method described herein, and had a compressive depth of layer DOL of 26.1 μm and a surface compressive stress CS of 795 MPa.

Sample set B consists of soda lime glass (SLG) having a thickness of 0.8 mm. The sample was ion exchanged using a single step ion exchange to achieve a compressive depth of layer of 12 μm and a compressive stress of 512 MPa.

Figure 18A:
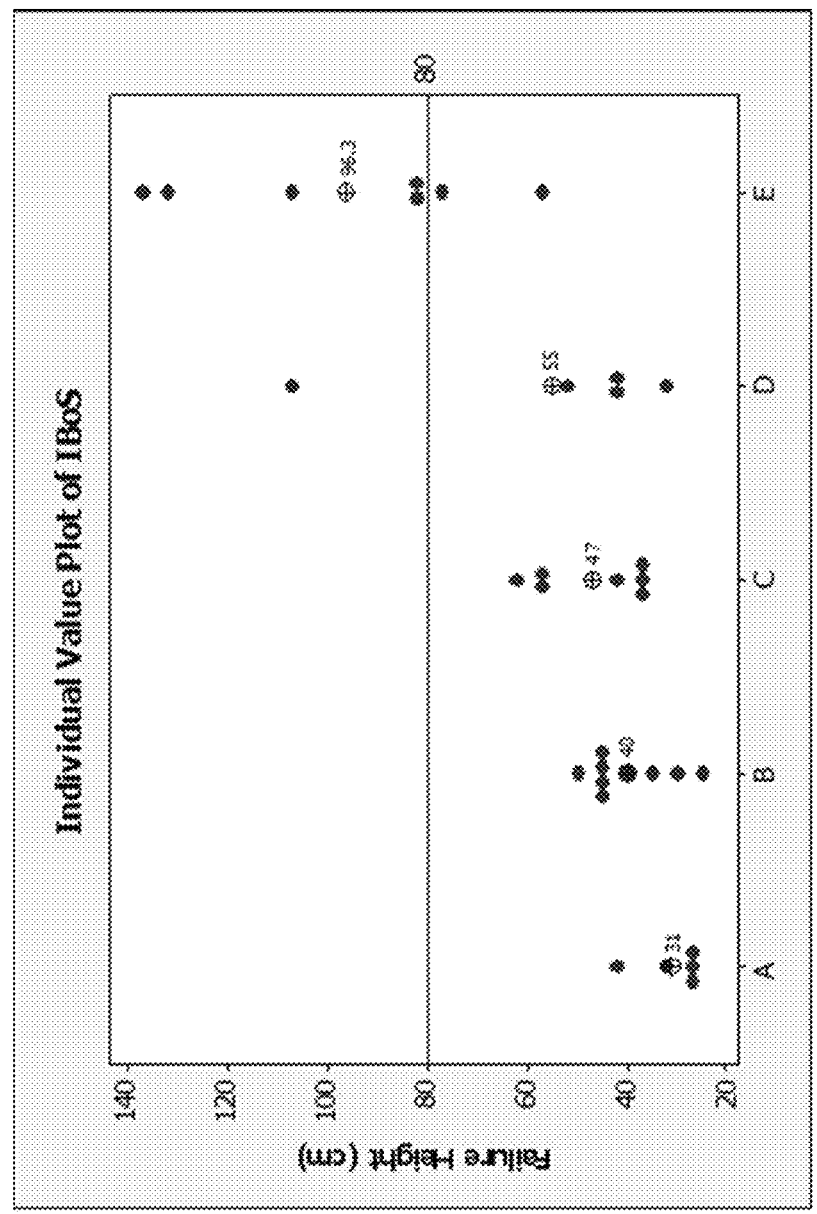
FIG. 18a is a plot of drop height at failure as a function of depth of layer DOL, as measured by FSM, of ion exchanged glass samples.

Sample thickness, depth of layer (DOL), surface compressive stress (CS), estimated average drop height at which fracture occurred, and survivability rates determined for a drop height of 80 cm are listed in Table 3. Heights at which fracture occurred for individual samples are plotted in FIG. 18a.

TABLE 3

Sample thickness, depth of layer (DOL), surface compressive stress (CS), and estimated average fracture height of samples subjected to IBoS testing.

| Sample | Thickness (mm) | CS (MPa) | DOL (gm) | Avg. Fracture Height (cm) | % survival at 80 cm |
|---|---|---|---|---|---|
| A | 0.8 | — | — | 31 | 0 |
| B | 0.8 | 512 | 12 | 40 | 0 |
| C | 0.8 | 795 | 26.1 | 47 | 0 |
| D | 0.8 | 885 | 47 | 55 | ~20 |
| E | 0.8 | 865 | 97 | 96.3 | ~70 |

Sample set E exhibited the greatest average fracture height (96.3 mm) and survivability rate (about 70%) for the 80 cm drop height. Sample D, having a composition and sample thickness identical to sample sets A and E but having a compressive depth of layer that was approximately half of that of sample E, had an average fracture/failure height of about 55 cm and survivability rate of about 20% for the 80 cm drop height. Sample set A, which consisted of glasses having the same composition and thickness as those of sample sets D and E had a mean failure height of 31 cm and a 0% survivability rate for 80 cm drop height.

Compared to ion exchanged soda lime glass (sample set B, average fracture height of about 40 cm), ion exchanged sample set C (Dragontrail) exhibited improved inverted ball drop performance, exhibiting an average failure drop height of 47 cm. Survivability rates for sample sets B and C for a 80 cm drop height were both 0%.

The difference in fracture/failure heights observed for sample D and those observed for sample E and the other ion exchanged glasses studied illustrates the effectiveness of deep depth of layer and the stress profile obtained by the dual ion exchange process in preventing the type of damage to the glass experienced during field use.

Figure 18B:
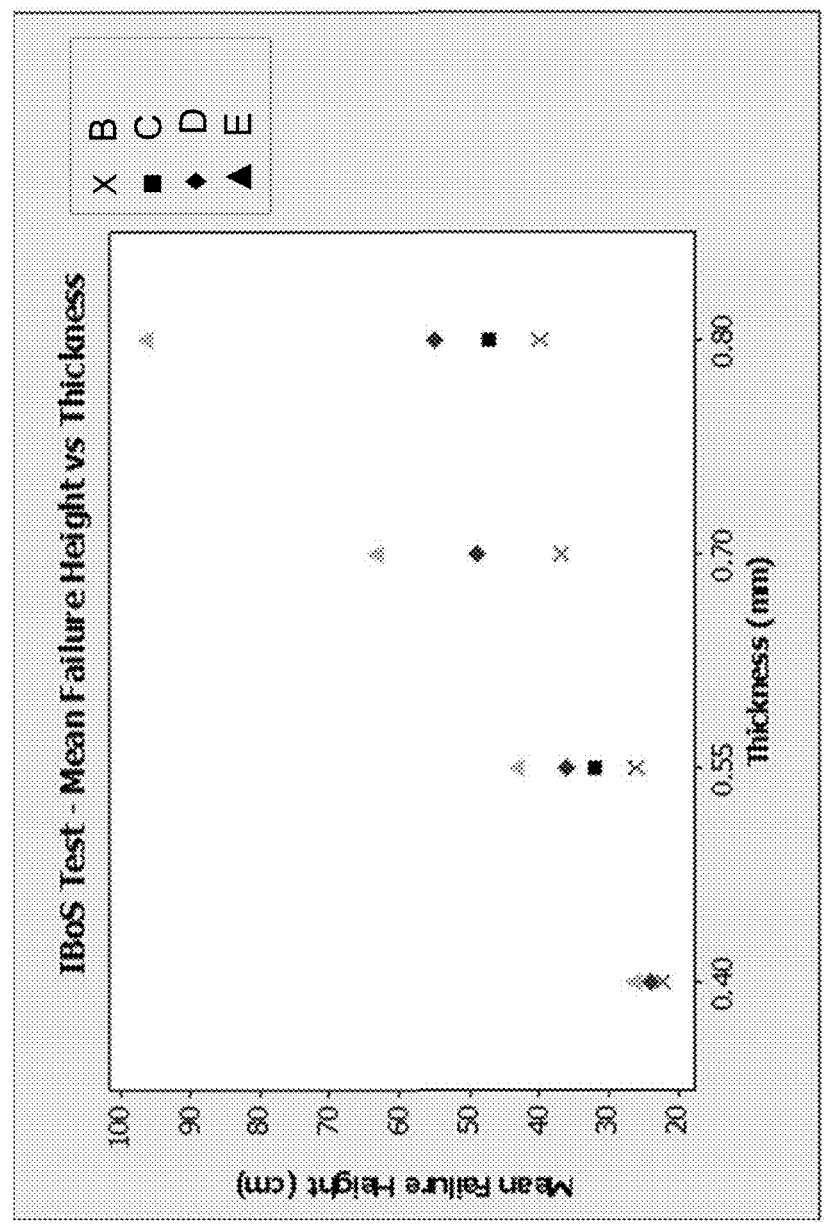
FIG. 18b is a plot of average failure height as a function of glass sample thickness.

Fracture/failure height also varies as a function of the thickness of the glass. A plot of average failure height as a function of sample thickness for sample sets B, C, D, and E is shown in FIG. 18b. As seen in FIG. 18b, the failure height of all sample groups increased with increasing glass thickness. The samples in group E, which underwent the two-step ion exchange process described herein, exhibited the greatest increase in mean failure height over the thickness range studied, followed by samples of identical composition that had undergone the single ion exchange process (sample set D).

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article having a thickness t, the glass article comprising:
   a compressive layer having a compressive stress CS in a range from about 500 MPa up to about 1200 MPa at a surface of the glass article, wherein:
   a. the compressive layer extends from the surface to a depth of compression DOC, wherein DOC≥0.1·t when t<0.5 mm and DOC≥50 μm when t≥0.5 mm, and wherein the compressive layer has a compressive stress profile; and b. the compressive stress profile comprises:
  i. a first portion b extending from the surface to a depth $d_b$ and having an average slope $m_b$, wherein 3 µm≤$d_b$≤15 µm and −40 MPa/µm≥$m_b$≥−200 MPa/µm;
  ii. a second portion c extending from a depth $d_c$ to the DOC and having an average slope $m_c$, wherein −2 MPa/µm≥$m_c$≥−8 MPa/µm; and
  iii. a transition region extending from $d_b$ to $d_c$ having a slope that transitions from slope $m_b$ to slope $m_c$.

2. The glass article of claim 1, wherein −40 MPa/µm≥$m_b$≥−120 MPa/µm.

3. The glass article of claim 1, wherein thickness t is in a range from about 0.15 mm up to about 2.0 mm.

4. The glass article of claim 1, wherein the glass article comprises an alkali aluminosilicate glass.

5. The glass article of claim 4, wherein the alkali aluminosilicate glass further comprises up to about 10 mol % $Li_2O$.

6. The glass article of claim 1, wherein the glass is lithium-free.

7. A glass article having a thickness t, the glass article comprising:
  a compressive layer having a compressive stress CS in a range from about 500 MPa up to about 1200 MPa at a surface of the glass article, wherein:
    a. the compressive layer extends from the surface to a depth of compression DOC, wherein DOC≥0.1·t when t<0.5 mm and DOC≥50 µm when t≥0.5 mm, and wherein the compressive layer has a compressive stress profile; and
    b. the compressive stress profile comprises:
      i. a first portion b extending from the surface to a depth $d_b$ and having a an average slope $m_b$, wherein 3 µm≤$d_b$≤15 µm and −40 MPa/µm≥$m_b$≥−200 MPa/µm
      ii. a second portion c extending from a depth $d_c$ to the DOC and having an average slope $m_c$, and
      iii. a transition region extending from $d_b$ to $d_c$ having a slope that transitions from slope $m_b$ to slope $m_c$.

8. The glass article of claim 7, wherein −40 MPa/µm≥$m_b$≥−120 MPa/µm.

9. The glass article of claim 7, wherein thickness t is in a range from about 0.15 mm up to about 2.0 mm.

10. The glass article of claim 7, wherein the glass article comprises an alkali aluminosilicate glass.

11. The glass article of claim 10, wherein the alkali aluminosilicate glass further comprises up to about 10 mol % $Li_2O$.

12. The glass article of claim 7, wherein the glass is lithium-free.

13. The glass article of claim 7, wherein the first portion b is linear such that $$|\sigma''(x)| < \left|2\frac{\sigma'(x)}{d_b}\right|$$

where $\sigma''(x)$ is the second derivative of the stress profile in the first portion b with respect to depth x and $\sigma'(x)$ is the first derivative of the stress profile in the first portion b with respect to depth x.

14. The glass article of claim 13, wherein the first portion b is linear such that $$|\sigma''(x)| < \left|\frac{\sigma'(x)}{d_b}\right|.$$

15. A glass article having a thickness t, the glass article comprising:
  a compressive layer having a compressive stress CS in a range from about 500 MPa up to about 1200 MPa at a surface of the glass article, wherein:
    a. the compressive layer extends from the surface to a depth of compression DOC, wherein DOC≥0.1·t when t<0.5 mm and DOC≥50 µm when t≥0.5 mm, and wherein the compressive layer has a compressive stress profile; and
    b. the compressive stress profile comprises:
      i. a first portion b extending from the surface to a depth $d_b$ and having an average slope $m_b$, wherein 3 µm≤$d_b$≤15 µm;
      ii. a second portion c extending from a depth $d_c$ to the DOC and having an average slope $m_c$, wherein −2 MPa/µm≥$m_c$≥−8 MPa/µm; and
      iii. a transition region extending from $d_b$ to $d_c$ having a slope that transitions from slope $m_b$ to slope $m_c$.

16. The glass article of claim 15, wherein thickness t is in a range from about 0.15 mm up to about 2.0 mm.

17. The glass article of claim 15, wherein the glass article comprises an alkali aluminosilicate glass.

18. The glass article of claim 17, wherein the alkali aluminosilicate glass further comprises up to about 10 mol % $Li_2O$.

19. The glass article of claim 15, wherein the glass is lithium-free.

20. The glass article of claim 15, wherein the second portion c is linear such that $$|\sigma''(x)| < \left|2\frac{\sigma'(x)}{d_c}\right|$$

where $\sigma''(x)$ is the second derivative of the stress profile in the second portion c with respect to depth x and $\sigma'(x)$ is the first derivative of the stress profile in the second portion c with respect to depth x.

21. The glass article of claim 20, wherein the second portion c is linear such that $$|\sigma''(x)| < \left|\frac{\sigma'(x)}{d_c}\right|.$$

22. A glass article having a thickness t, the glass article comprising:
  a compressive layer having a compressive stress CS in a range from about 500 MPa up to about 1200 MPa at a surface of the glass article, wherein:
    a. the compressive layer extends from the surface to a depth of compression DOC, wherein DOC≥0.1·t when t<0.5 mm and DOC≥50 µm when t≥0.5 mm, and wherein the compressive layer has a compressive stress profile; and b. the compressive stress profile comprises:
  i. a first portion b extending from the surface to a depth $d_b$ and having an average slope $m_b$, wherein 3 μm≤$d_b$≤15 μm;
  ii. a second portion c extending from a depth $d_c$ to the DOC and having an average slope $m_c$; and
  iii. a transition region extending from $d_b$ to $d_c$ having a slope that transitions from slope $m_b$ to slope $m_c$, wherein $d_c$-$d_b$ is 8 μm or less.

23. The glass article of claim 22, wherein $d_c$-$d_b$ is 7 μm or less.

24. The glass article of claim 22, wherein $d_c$-$d_b$ is 5 μm or less.

25. The glass article of claim 22, wherein 3 μm≤$d_b$≤12 μm.

26. The glass article of claim 22, wherein thickness t is in a range from about 0.15 mm up to about 2.0 mm.

27. The glass article of claim 22, wherein the glass article comprises an alkali aluminosilicate glass.

28. The glass article of claim 22, wherein DOC≥0.11·t when t<0.5 mm and 55 μm≤DOC≤100 μm when t≥0.5 mm.

29. The glass article of claim 22, wherein the glass is lithium-free.

30. An electronic device comprising the glass article of claim 1.

31. The electronic device of claim 30, wherein the glass article is a cover plate, window, or display.

32. An electronic device comprising the glass article of claim 7.

33. The electronic device of claim 32, wherein the glass article is a cover plate, window, or display.

34. An electronic device comprising the glass article of claim 15.

35. The electronic device of claim 34, wherein the glass article is a cover plate, window, or display.

36. An electronic device comprising the glass article of claim 22.

37. The electronic device of claim 36, wherein the glass article is a cover plate, window, or display.

\* \* \* \* \*

UNITED STATES PATENT AND TRADEMARK OFFICE
CERTIFICATE OF CORRECTION

PATENT NO. : 9,487,434 B2
APPLICATION NO. : 15/158167
DATED : November 8, 2016
INVENTOR(S) : Jaymin Amin et al.

It is certified that error appears in the above-identified patent and that said Letters Patent is hereby corrected as shown below:

On the Title Page

On page 2, in Column 2, item (56), Other Publications, Line 14, delete "sal-gel" and insert -- sol-gel --, therefor.

On page 2, in Column 2, item (56), Other Publications, Line 19, delete "Opinoin" and insert -- Opinion --, therefor.

On page 2, in Column 2, item (56), Other Publications, Line 20, delete "SU2015" and insert -- US2015 --, therefor.

On page 2, in Column 2, item (56), Other Publications, Line 22, delete "Opinoin" and insert -- Opinion --, therefor.

On page 2, in Column 2, item (56), Other Publications, Line 25, delete "Opinpoin" and insert -- Opinion --, therefor.

On page 2, in Column 2, item (56), Other Publications, Line 28, delete "Opinoin" and insert -- Opinion --, therefor.

On page 2, in Column 2, item (56), Other Publications, Line 31, delete "Opinoin" and insert -- Opinion --, therefor.

On page 2, in Column 2, item (56), Other Publications, Lines 31-32, delete "International searching International searching" and insert -- International searching --, therefor.

In the Claims

In Column 35, Line 37, Claim 7, delete "a an" and insert -- an --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*